(12) United States Patent
Yoeda

(10) Patent No.: US 6,994,060 B2
(45) Date of Patent: Feb. 7, 2006

(54) CONTROL APPARATUS AND METHOD FOR VARIABLE VALVE

(75) Inventor: Keiji Yoeda, Numazu (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 10/867,820

(22) Filed: Jun. 16, 2004

(65) Prior Publication Data

US 2005/0011477 A1 Jan. 20, 2005

(30) Foreign Application Priority Data

Jun. 17, 2003 (JP) .............................. 2003-172562
Jun. 14, 2004 (JP) .............................. 2004-175574

(51) Int. Cl.
*F01L 9/04* (2006.01)

(52) U.S. Cl. .................................. 123/90.11; 123/90.15; 123/90.24; 251/129.01; 251/129.04; 251/129.07; 251/129.1; 251/129.15; 251/129.18; 251/129.19; 701/107

(58) Field of Classification Search ............. 123/90.11, 123/90.15–90.18; 701/107
See application file for complete search history.

(56) References Cited

U.S. PATENT DOCUMENTS 6,044,814 A * 4/2000 Fuwa ........................ 123/90.11
6,073,596 A * 6/2000 Kemper .................... 123/90.11
6,390,039 B2 5/2002 Fuwa
6,422,185 B1 * 7/2002 Duesmann et al. ...... 123/90.11
6,435,147 B1 * 8/2002 Eichenseher et al. .... 123/90.11
6,619,245 B1 9/2003 Fujiwara et al.
6,701,887 B2 * 3/2004 Salber et al. ................ 123/315
2003/0188703 A1 * 10/2003 Vanderpoel ............... 123/90.16

FOREIGN PATENT DOCUMENTS

JP A-11-132017 5/1999
JP A-11-294209 10/1999

* cited by examiner

*Primary Examiner*—Thomas Denion
*Assistant Examiner*—Kyle M. Riddle
(74) *Attorney, Agent, or Firm*—Oliff & Berridge, PLC

(57) ABSTRACT

A control apparatus controls an electromagnetically driven valve, which includes at least one of an electromagnetically driven exhaust valve for opening or closing an exhaust valve and an electromagnetically driven intake valve for opening or closing an intake valve in an internal combustion engine. The control apparatus is provided with: a first judging device for judging whether or not the electromagnetically driven valve fails in seating for valve-opening; and a fail-safe device for controlling the electromagnetically driven valve to perform an operation of valve-opening again in a same stroke if it is judged by the first judging device that the electromagnetically driven valve fails in the seating for valve-opening.

15 Claims, 16 Drawing Sheets

CONTROL APPARATUS AND METHOD FOR VARIABLE VALVE

BACKGROUND OF THE INVENTION

1. Field of the Invention

The present invention relates to a variable valve which functions as an intake valve or an exhaust valve of an internal combustion engine mounted on a vehicle or the like. More specifically, the present invention relates to a control apparatus for and a control method of controlling an electromagnetically driven valve to perform fail-safe processing if abnormality occurs in the electromagnetically driven valve.

2. Description of the Related Art

Conventionally, the electromagnetically driven valve is provided with: a valve body which functions as the intake valve or the exhaust valve of the internal combustion engine; and a movable needle which is connected to the valve body and which displaces in the axial direction of the valve body. Hereinafter, the valve body and the movable needle are referred to as a "movable portion", as occasion demands. The exhaust valve or the intake valve can be opened and closed any time (i) by supplying an exciting current to an electromagnetic coil for valve-closing or an electromagnetic coil for valve-opening at an appropriate timing, thereby to generate an electromagnetic power, in order to suction the movable needle which is held at a middle position by the elastic force or applied force of a spring, and (ii) by displacing the movable portion to the side of the electromagnetic coil for valve-closing or the side of the electromagnetic coil for valve-opening.

For example, Japanese Patent Application Laying Open NO. 2002-81329 discloses a technique of controlling the electromagnetically driven valve to supply a proper exciting current to the electromagnetic coil for valve-closing and the electromagnetic coil for valve-opening, in order to properly and surely move or displace the valve body between a fully closed position (i.e., a condition of "seating for valve-closing") and a fully opened position (i.e., a condition of "seating for valve-opening") of the electromagnetically driven valve. However, it can be assumed that an operation of valve-opening or an operation of valve-closing does not succeed completely or perfectly, (i) from a cause by a change with the passage of time, such as a change in mass of the movable portion and a change in a friction force by the wear of the spring, by the accumulation of deposits onto the movable portion, by abrasion, or the like, and (ii) from an unexpected or sudden cause, such as a reading error of a lift sensor and a foreign body stuck between the valve body and a valve seat.

For example, Japanese Patent Application Laying Open NO. Hei 11-132017 discloses a technique of preventing the step-out of the valve body by increasing an electromagnetic force which suctions the movable portion in the displacement direction by supplying the exciting current to the electromagnetic coil if a deviation between a detected displacement amount of the electromagnetically driven valve and a desired displacement amount is greater than or equal to a threshold value. Here, the "step-out" is such a phenomenon that the valve body of the electromagnetically driven valve is held at a neutral position while the valve opening or closing of the electromagnetically driven valve is driven and that the valve opening or closing cannot be normally driven.

For example, Japanese Patent Application Laying Open NO. 2001-159331 discloses a fail-safe technique of controlling the electromagnetically driven valve to maintain it in the fully closed position by increasing an exciting current amount of the electromagnetic coil for valve-closing, thereby to close the valve, if the electromagnetically driven valve is opened and fails in seating for valve-opening. There is another technique disclosed in Japanese Patent Application Laying Open NO. Hei 11-294209.

However, it is impossible to attain such fail-safe processing that a pressure condition and a combustion condition or the like in a cylinder obtained after the electromagnetically driven valve is maintained in the fully closed position are considered, only by controlling the electromagnetically driven valve by the conventional fail-safe technique for the electromagnetically driven valve, which is disclosed in the above-described Japanese Patent Application Laying Open NO. 2001-159331 or the like, so as to maintain it again in the fully closed position if the electromagnetically driven valve fails in the seating for valve-opening. This possibly causes the reduction of exhaust efficiency, the reduction of filling efficiency for an intake air, the step-out of the electromagnetically driven valve, or the like, and eventually causes a decrease in the output of the internal combustion engine, the deterioration of exhaust emissions, or the like, which is a technical problem.

SUMMARY OF THE INVENTION

It is therefore an object of the present invention to provide a control apparatus for and a control method of controlling a variable valve, by which it is possible to reduce the influence of failure or abnormality even if the failure or the abnormality occurs in the operation of valve-opening and the operation of valve-closing of the electromagnetically driven valve, for example.

The main purpose of the present invention is to inhibit the reduction of the intake efficiency, in addition to or in place of the exhaust efficiency, by opening the variable valve again in the same stroke in consideration of, e.g., the number of engine revolutions in the internal combustion engine, a valve-opening speed of the variable valve, and further an actual product of the opening area and time of the variable valve or the like, if the variable valve fails in the seating for valve-opening in the technique of controlling the variable valve. The failure in the seating for valve-opening and valve-closing include any situation which causes abnormal valve-opening and valve-closing operation.

The above object of the present invention can be achieved by a first control apparatus for controlling an electromagnetically driven valve, which includes at least one of an electromagnetically driven exhaust valve for opening or closing an exhaust valve and an electromagnetically driven intake valve for opening or closing an intake valve in an internal combustion engine, the control apparatus provided with: a first judging device for judging whether or not the electromagnetically driven valve fails in seating for valve-opening; and a fail-safe device for controlling the electromagnetically driven valve to perform an operation of valve-opening again in a same stroke of the operation of valve-opening if it is judged by the first judging device that the electromagnetically driven valve fails in the seating for valve-opening.

According to the first control apparatrs for controlling an electromagnetically driven valve, in the normal operation thereof, specifically, an intake air amount is adjusted by that at least one of the electromagnetically driven exhaust valve and the electromagnetically driven intake valve which is opened and closed at a proper timing according to the number of engine revolutions of the internal combustion engine. More specifically, the valve-opening of the electromagnetically driven valve inclides: releasing it from the fully closed position (release for valve-closing); and seating it to the fully opened position (seating for valve-opening). On the other hand, the valve-closing of the electromagnetically driven valve includes: releasing it from the fully opened position (release for valve-opening); and seating it to the fully closed position (seating for valve-closing).

For example, if the electromagnetically driven valve fails in the seating for valve-opening, the failure in the seating for valve-opening is judged by the first judging device. Specifically, the first judging device judges or determines whether or not the electromagnetically driven valve fails in seating for valve-opening on the basis of an output of the detection by a lift sensor directly mounted on the electromagnetically driven valve, for example. Alternatively, it may indirectly determine whether or not the electromagnetically driven valve fails in seating for valve-opening, on the basis of an output of the detection by other sensors for measuring an exciting current amount of the electromagnetically driven valve or the like.

For example, if the number of engine revolutions is relatively low (low-speed revolutions), and if it is judged by the first judging device that the electromagnetically driven valve fails in seating for valve-opening, the electromagnetically driven valve is controlled to perform the operation of valve-opening again in the same stroke, under the control of the fail-safe device. Incidentally, the "stroke" associated with the present invention means each of an exhaust stroke, an intake stroke, a compression stroke, and a combustion (expansion) stroke in the internal combustion engine.

In the present invention, in an abnormal case, the opening/closing characteristics of the exhaust valve and the intake valve are controlled, under the control of the "fail-safe device", the "first judging device", a "second judging device", a "third judging device", a "measuring device for measuring an actual product of the opening area and time", a "calculating device for calculating a target product of the opening area and time", which are described later, for example. In a normal case, they are controlled under the control of at least one of the "electromagnetically driven exhaust valve" and the "electromagnetically driven intake valve". These constituent elements may be constructed from the same controller (e.g. an ECU described later) or the same control device which is capable of performing both the control in the abnormal case and the control in the normal case. Alternatively, they may be constructed from different exclusive controllers or different control devices, each of which is capable of performing respective one of the control in the abnormal case and the control in the normal case.

In general, the exhaust efficiency by the exhaust valve and the intake efficiency by the intake valve, i.e., charging efficiency is influenced by three factors, which are the valve-opening timing, the valve-closing timing, and the actual product of the opening area and time of the exhaust valve and the intake valve. Here, the "actual product of the opening area and time" is a measured quantity calculated by multiplying a time length in which the electromagnetically driven valve is actually open and a valve lift amount. Qualitatively, in the case of the actual product of the opening area and time of the exhaust valve, it means the degree of completion of the exhaust stroke and is substantially in inverse proportion to the amount of burned gas remained in the cylinder. Specifically, if the actual product of the opening area and time of the electromagnetically driven exhaust valve is large, the exhaust efficiency increases, and the amount of burned gas remained in the cylinder decreases.

On the other hand, if the actual product of the opening area and time of the electromagnetically driven exhaust valve is small, the exhaust efficiency decreases, and the amount of burned gas remained in the cylinder increases. Moreover, qualitatively, in the case of the actual product of the opening area and time of the intake valve, it means the degree of completion of the intake stroke and is substantially proportional to the amount of burned gas remained in the cylinder. Specifically, if the actual product of the opening area and time of the electromagnetically driven intake valve is large, the intake efficiency increases, and the amount of air inhaled into the cylinder increases. On the other hand, if the actual product of the opening area and time of the electromagnetically driven intake valve is small, the intake efficiency decreases, and the amount of air inhaled into the cylinder decreases. Particularly, for example, if the number of engine revolutions is relatively low (low-speed revolutions), the actual product of the opening area and time is sufficiently secured, so that the exhaust efficiency and the intake efficiency are influenced the most by the valve-closing timing of the exhaust valve and the intake valve.

Particularly in the present invention, in order to match the valve-closing timing of the exhaust valve and the intake valve with the valve-closing timing in the normal case, if the electromagnetically driven valve fails in the seating for valve-opening, the electromagnetically driven valve is opened again in the same stroke, thereby to seat it for valve-opening, under the control of the fail-safe device. By this, it is possible to reduce a bad influence on a next stroke by the failure in the seating for valve-opening of the electromagnetically driven valve, and it is possible to inhibit the reduction the intake efficiency in addition to or in place of the exhaust efficiency.

Thus, it is possible to inhibit a cylinder pressure from increasing and being a higher pressure than an intake-port pressure by inhibiting the increase in the amount of burned gas remained in the cylinder, which is caused by the reduction of the exhaust efficiency. Therefore, in the next intake stroke, it is possible to prevent the elctromagnetically driven intake valve from receiving a pressure from the inside of the cylinder in the direction against the valve-opening of the electromagnetically driven intake valve and from failing in the seating for valve-opening or from stepping out. Moreover, it is possible to prevent the burned gas from backflowing to an intake system when the electromagnetically driven intake valve is opened in the intake stroke, and it is possible to inhibit the reduction of the intake efficiency, by inhibiting the increase in the amount of burned gas remained in the cylinder, which is caused by the reduction of the exhaust efficiency.

On the other hand, with respect to the intake efficiency, it is possible to inhibit the decrease in the output of the internal combustion engine, which is caused by that the air/fuel mixture of an appropriate amount of new air and fuel is not taken in the cylinder, thereby causing improper combustion, because of the reduction of the intake efficiency. In addition, it is possible to inhibit the increase in an intake pump loss. Moreover, it is possible to prevent the intake air amount from being insufficient, the air/fuel ratio from decreasing, and the inside of the cylinder from being in an excessive rich condition, because of the reduction intake efficiency. Therefore, it is possible to prevent the occurrence of an accidental fire in the cylinder, and it is possible to prevent the air/fuel mixture including a large amount of unburned fuel, in other words, raw gas, from being exhausted without sufficient purification by a catalyst or the like. Thus, it is possible to inhibit deterioration of the exhaust emissions.

As described above, according to the first control apparatus for controlling an electromagnetically driven valve, it is possible to inhibit the reduction of the intake efficiency, in addition to or in place of the exhaust efficiency, by opening the electromagnetically driven valve again in the same stroke if the electromagnetically driven valve fails in the seating for valve-opening.

In one aspect of the first control apparatus for controlling an electromagnetically driven valve of the present invention, the fail-safe device controls the electromagnetically driven valve to perform the operation of valve-opening again in the same stroke after seating for valve-closing if it is judged that the electromagnetically driven valve fails in the seating for valve-opening.

According to this aspect, the electromagnetically driven exhaust valve and the electromagnetically driven intake valve are opened again and seated for valve opening after they are seated for valve-closing in the same stroke in order to substantially match the valve-closing timing, which influences the exhaust efficiency and the intake efficiency the most, with the valve-closing timing in the normal case, under the control of the fail-safe device. Therefore, it is possible to inhibit the reduction of the intake efficiency, in addition to or in place of the exhaust efficiency.

In another aspect of the first control apparatus for controlling an electromagnetically driven valve of the present invention, the fail-safe device controls the electromagnetically driven valve to seat for valve-closing at a same valve-closing timing as in a normal case, after seating again for valve-opening in the same stroke.

According to this aspect, the valve-closing timing of the electromagnetically driven exhaust valve and the electromagnetically driven intake valve, which influences the exhaust efficiency and the intake efficiency the most, is brought close to the valve-closing timing in the normal case, under the control of the fail-safe device. Therefore, it is possible to inhibit the reduction of the intake efficiency, in addition to or in place of the exhaust efficiency.

In another aspect of the first control apparatus for controlling an electromagnetically driven valve of the present invention, it is further provided with: a second judging device for judging whether or not there is time to perform the operation of valve-opening the electromagnetically driven valve again in the same stroke, the fail-safe device controlling the electromagnetically driven valve to perform the operation of valve-opening again in the same stroke only if it is judged that there is the time.

According to this aspect, it is possible to perform the control by the fail-safe device more accurately by opening again the electromagnetically driven exhaust valve and the electromagnetically driven intake valve with time as a reference. Therefore, it is possible to inhibit the reduction of the intake efficiency, in addition to or in place of the exhaust efficiency.

In an aspect associated with the second judging device, the first control apparatus may be further provided with: an engine-revolutions detecting device for detecting the number of engine revolutions of the internal combustion engine, the second judging device judging whether or not there is the time on the basis of the number of engine revolutions detected by the engine-revolutions detecting device.

By constituting in this manner, the second judging device is relatively easily capable of judging whether or not there is time to seat the electromagnetically driven valve for valve-opening again in the same stroke. For example, the second judging device may be constructed to directly compare the number of engine revolutions with the number of engine revolutions set in advance as being a predetermined threshold value. Alternatively, it may be constructed to calculate the remaining time in the same stroke from the number of engine revolutions or from both the number of engine revolutions and a time point of the failure in the seating for valve-opening, and to compare the remaining time with a time length for valve opening or closing set in advance as being a predetermined threshold value. The "number of engine revolutions set in advance as being a predetermined threshold value" is calculated by using a time length required for the valve-opening and valve-closing of the electromagnetically driven valve which is the performance of the electromagnetically driven valve, and an operating angle, as parameters.

In an aspect of the fail-safe device, the fail-safe device controls at least one of the electromagnetically driven valve, a fuel injection valve, and an ignition plug to prohibit at least one of the operation of valve-opening of the electromagnetically driven valve, and fuel injection and ignition with respect to the internal combustion engine, until the same stroke in a next cycle, if it is judged that there is no time to perform the operation of valve-opening again in the same stroke.

By constituting in this manner, it is possible to omit the ineffective operation of valve-opening of the electromagnetically driven valve, and the excessive fuel injection and the ineffective ignition in the cylinder which is inappropriate condition for combustion. Thus, it is possible to suppress the influence of the failure in the seating for valve-opening on the next cycle, and it is possible to perform the operation of valve-opening of the electromagnetically driven valve, the fuel injection, and the ignition, in the next cycle in the same manner as in the normal case.

In another aspect of the first control apparatus for controlling an electromagnetically driven valve of the present invention, it is further provided with: a measuring device for measuring an actual product of an opening area and time of the electromagnetically driven valve if it is judged that the electromagnetically driven valve fails in the seating for valve-opening; and a third judging device for judging whether or not the electromagnetically driven valve is to be prohibited from perform the operation of valve-opening again in the same stroke or in the same cycle on the basis of the measured actual product of the opening area and time, the fail-safe device controlling the electromagnetically driven valve to prohibit it from opening in the same stroke or in the same cycle and to prohibit it from opening until the same stroke in a next cycle, only if it is judged that the electromagnetically driven valve is to be prohibited.

According to this aspect, for example, even if the number of engine revolution is relatively high (high-speed revolutions), it is judged by the third judging device how considerably the amount of burned gas remained in the cylinder influences the operation of valve-opening of the electromagnetically driven valve, after the exhaust stroke, on the basis of the directly measured actual product of the opening area and time of the electromagnetically driven valve. Only if the influence is considerable, it is possible to prohibit the electromagnetically driven valve from opening again in the same stroke and to prohibit it from opening in the same cycle, i.e. until the exhaust stroke in the next cycle. Thus, it is possible to realize the control by the fail-safe device more appropriately.

In an aspect associated with the third judging device, the first control apparatus may be further provided with: a calculating device for calculating a target product of the opening area and time on the basis of required torque of the internal combustion engine, the third judging device judging that the electromagnetically driven intake valve is to be prohibited from perform the operation of valve-opening in the same cycle, in such a condition that the measured actual product of the opening area and time of the electromagnetically driven exhaust valve is less than the calculated target product of the opening area and time.

By constituting in this manner, it is possible to calculate the target product of the opening area and time relatively easily and quickly by the calculating device for calculating a target product of the opening area and time. If the actual product of the opening area and time of the electromagnetically driven exhaust valve is less than the target product of the opening area and time, the pressure in the cylinder is high and the electromagnetically driven intake valve highly possibly fails in the seating for valve-opening even if opened. Thus, the electromagnetically driven valve is controlled so as to prohibit the valve-opening of the electromagnetically driven intake valve in the same cycle.

Here, the "target product of the opening area and time" is, in the case of the electromagnetically driven exhaust valve, an actual product of the opening area and time of the electromagnetically driven exhaust valve minimally required for the valve-opening against the cylinder pressure, which is proportional to the amount of burned gas remained in the cylinder without being exhausted. On the other hand, in the case of the electromagnetically driven intake valve, it is an actual product of the opening area and time of the electromagnetically driven intake valve minimally required to allow the ignition and combustion of the air/fuel mixture of fuel and new air inhaled into the cylinder by the electromagnetically driven intake valve. In any case, the target product of the opening area and time is a reference value determined with both the number of engine revolutions and an engine load for indicating the torque to the internal combustion engine, as parameters. Incidentally, the engine load is proportional to an initial amount of the burned gas.

In an aspect associated with the fail-safe device, the fail-safe device may controls at least one of the electromagnetically driven valve, a fuel injection valve, and an ignition plug to prohibit at least one of the operation of valve-opening of the electromagnetically driven valve, and fuel injection and ignition with respect to the internal combustion engine, until the same stroke in a next cycle, if it is judged that the electromagnetically driven valve is not to be prohibited.

By constituting in this manner, it is possible to omit the ineffective operation of valve-opening of the electromagnetically driven valve, and the excessive fuel injection and the ineffective ignition in the cylinder which is inappropriate condition for combustion. Thus, it is possible to perform the operation of valve-opening of the electromagnetically driven valve, the fuel injection, and the ignition, in the next cycle in the same manner as in the normal case almost without having almost any influence of the failure in the seating for valve-opening on the next cycle.

The above object of the present invention can be achieved by a second control apparatus for controlling an electromagnetically driven valve, which includes at least one of an electromagnetically driven exhaust valve for opening or closing an exhaust valve and an electromagnetically driven intake valve for opening or closing an intake valve in an internal combustion engine, the control apparatus provided with: a first judging device for judging whether or not the electromagnetically driven valve fails in seating for valve-opening; and a fail-safe device for controlling at least one of the electromagnetically driven valve, a fuel injection valve, and an ignition plug to prohibit at least one of an operation of valve-opening of the electromagnetically driven valve, and fuel injection and ignition with respect to the internal combustion engine, until a same stroke in a next cycle of the operation of valve-opening, if it is judged that the electromagnetically driven valve fails in the seating for valve-opening.

According to the second control apparatus for controlling an electromagnetically driven valve of the present invention, it operates as with the above-described first control apparatus for controlling an electromagnetically driven valve, in the normal operation thereof.

For example, if the electromagnetically driven exhaust valve fails in the seating for valve-opening, at least one of the operation of valve-opening of the electromagnetically driven intake valve, and the fuel injection and the ignition with respect to the internal combustion engine, is prohibit until the same stroke in the next cycle, under the control of the fail-safe device.

For example, if fuel is not injected yet in the intake port in the same cycle upon the judgment by the first judging device, the fuel injection and the ignition are prohibited in the same cycle in advance, under the control of the fail-safe device. In the next cycle, the operation of valve-opening of the electromagnetically driven exhaust valve, the fuel injection, and the ignition are performed in the same manner as in the normal case. On the other hand, if the fuel is already injected in the same cycle upon the judgment by the first judging device, the fuel injection is continued and is not stopped halfway, under the control of the fail-safe device. Since the fuel for burning one time drifts in the intake port, the fuel injection in the next cycle is prohibited.

As described above, according to the second control apparatus for controlling an electromagnetically driven valve of the present invention, if the electromagnetically driven valve fails in the seating for valve-opening, it is possible to omit the ineffective operation of valve-opening of the electromagnetically driven valve, and the excessive fuel injection and the ineffective ignition in the cylinder which is inappropriate condition for combustion. Thus, it is possible to suppress the influence of the failure in the seating for valve-opening on the next cycle, and it is possible to perform the operation of valve-opening of the electromagnetically driven valve, the fuel injection, and the ignition, in the next cycle in the same manner as in the normal case. Thus, it is possible to inhibit the reduction the intake efficiency in addition to or in place of the exhaust efficiency.

In one aspect of the second control apparatus for controlling an electromagnetically driven valve of the present invention, the fail-safe device controls the fuel injection valve and the ignition plug to allow the fuel injection and prohibit the ignition in the same cycle, and to prohibit the fuel injection and perform the ignition in the next cycle, if the fuel injection is started in the same stroke in the same cycle.

According to this aspect, if fuel is already injected in the same cycle upon the judgment by the first judging device, the fuel injection is continued and is not stopped halfway, and the ignition is prohibited, under the control of the fail-safe device. Since the fuel for burning one time drifts in the intake port, the fuel injection in the next cycle is prohibited and the ignition is performed. In this case, since the fuel injection is already started, the fuel injection valve are controlled so as not to prohibit the fuel injection without exception, regardless of whether the fuel injection is completed or halfway. Namely, the fuel injected by the fuel injection is used in the next cycle. Thus, the failure in the seating for valve-opening of the electromagnetically driven valve hardly or does not influence the next cycle at all.

The above object of the present invention can be achieved by a variable valve mechanism for controlling a variable valve, which includes at least one of a variable exhaust valve for opening or closing an exhaust valve and a variable intake valve for opening or closing an intake valve in an internal combustion engine, the variable valve mechanism provided with: a first judging device for judging whether or not the variable valve fails in seating for valve-opening; and a fail-safe device for controlling the variable valve to perform an operation of valve-opening again in a same stroke of the operation of valve-opening if it is judged by said first judging device that the variable valve fails in the seating for valve-opening.

According to the variable valve mechanism for controlling a variable valve, in the normal operation thereof, specifically, an intake air amount is adjusted by that at least one of the variable exhaust valve and the variable intake valve which is opened and closed at a proper timing according to the number of engine revolutions of the internal combustion engine. More specifically, the variable valve mechanism can change a correlation of a phase of the cam and at least one of a lift amount and an operating angle of the valve.

As described above, according to the variable valve mechanism for controlling a variable valve, as with the above-described first control device for controlling an electromagnetically driven valve of the present invention, it is possible to inhibit the reduction of the intake efficiency, in addition to or in place of the exhaust efficiency, by opening the variable valve again in the same stroke if the variable valve fails in the seating for valve-opening.

The above object of the present invention can be achieved by a first control method of controlling an electromagnetically driven valve, which includes at least one of an electromagnetically driven exhaust valve for opening or closing an exhaust valve and an electromagnetically driven intake valve for opening or closing an intake valve in an internal combustion engine, the control method provided with: a first judging process of judging whether or not the electromagnetically driven valve fails in seating for valve-opening; and a fail-safe process of controlling the electromagnetically driven valve to perform an operation of valve-opening again in a same stroke of the operation of valve-opening if the electromagnetically driven valve fails in seating for valve-opening.

According to the first control method of controlling an electromagnetically driven valve, as with the above-described first control device for controlling an electromagnetically driven valve of the present invention, for example, it is possible to reduce a bad influence on the next stroke by the failure in the seating for valve-opening of the electromagnetically driven valve and it is possible to inhibit the reduction of the intake efficiency, in addition to or in place of the exhaust efficiency, by opening the electromagnetically driven valve again in the same stroke if the electromagnetically driven valve fails in the seating for valve-opening.

The above object of the present invention can be achieved by a second control method of controlling an electromagnetically driven valve, which includes at least one of an electromagnetically driven exhaust valve for opening or closing an exhaust valve and an electromagnetically driven intake valve for opening or closing an intake valve in an internal combustion engine, the control method provided with: a first judging process of judging whether or not the electromagnetically driven valve fails in seating for valve-opening; and a fail-safe process of controlling at least one of the electromagnetically driven valve, a fuel injection valve, and an ignition plug to prohibit at least one of an operation of valve-opening of the electromagnetically driven valve, and fuel injection and ignition with respect to the internal combustion engine, until a same stroke in a next cycle of the operation of valve-opening, if the electromagnetically driven valve fails in seating for valve-opening.

According to the second control method of controlling an electromagnetically driven valve, as with the above-described second control device for controlling an electromagnetically driven valve of the present invention, if the electromagnetically driven valve fails in the seating for valve-opening, it is possible to omit the ineffective operation of valve-opening of the electromagnetically driven valve, and the excessive fuel injection and the ineffective ignition in the cylinder which is inappropriate condition for combustion. Thus, it is possible to suppress the influence of the failure in the seating for valve-opening on the next cycle, and it is possible to perform the operation of valve-opening of the electromagnetically driven valve, the fuel injection, and the ignition, in the next cycle in the same manner as in the normal case. Thus, it is possible to inhibit the reduction the intake efficiency in addition to or in place of the exhaust efficiency.

The above object of the present invention can be achieved by a control method of controlling a variable valve mechanism for controlling a variable valve, which includes at least one of a variable exhaust valve for opening or closing an exhaust valve and a variable intake valve for opening or closing an intake valve in an internal combustion engine, the control method provided with: a first judging process of judging whether or not the variable valve fails in seating for valve-opening; and a fail-safe process of controlling the variable valve to perform an operation of valve-opening again in a same stroke of the operation of valve-opening if the variable valve fails in seating for valve-opening.

According to the control method of controlling a variable valve, as with the above-described variable valve mechanism for controlling a variable valve of the present invention, for example, it is possible to reduce a bad influence on the next stroke by the failure in the seating for valve-opening of the variable valve and it is possible to inhibit the reduction of the intake efficiency, in addition to or in place of the exhaust efficiency, by opening the variable valve again in the same stroke if the variable valve fails in the seating for valve-opening.

The nature, utility, and further features of this invention will be more clearly apparent from the following detailed description with reference to preferred embodiments of the invention when read in conjunction with the accompanying drawings briefly described below.

BRIEF DESCRIPTION OF THE DRAWINGS

FIG. 3 is a conceptual diagram showing (i) the ECU for controlling the electromagnetically driven valves associated with the embodiment, (ii) various sensors for inputting various detection signals and parameters to the ECU, and (iii) various valves controlled by the ECU or the like;

DETAILED DESCRIPTION OF THE PREFERRED EMBODIMENT

The specific embodiment of the control apparatus for controlling an electromagnetically driven valve associated with the present invention will be explained below with reference to the drawings.

Figure 1:
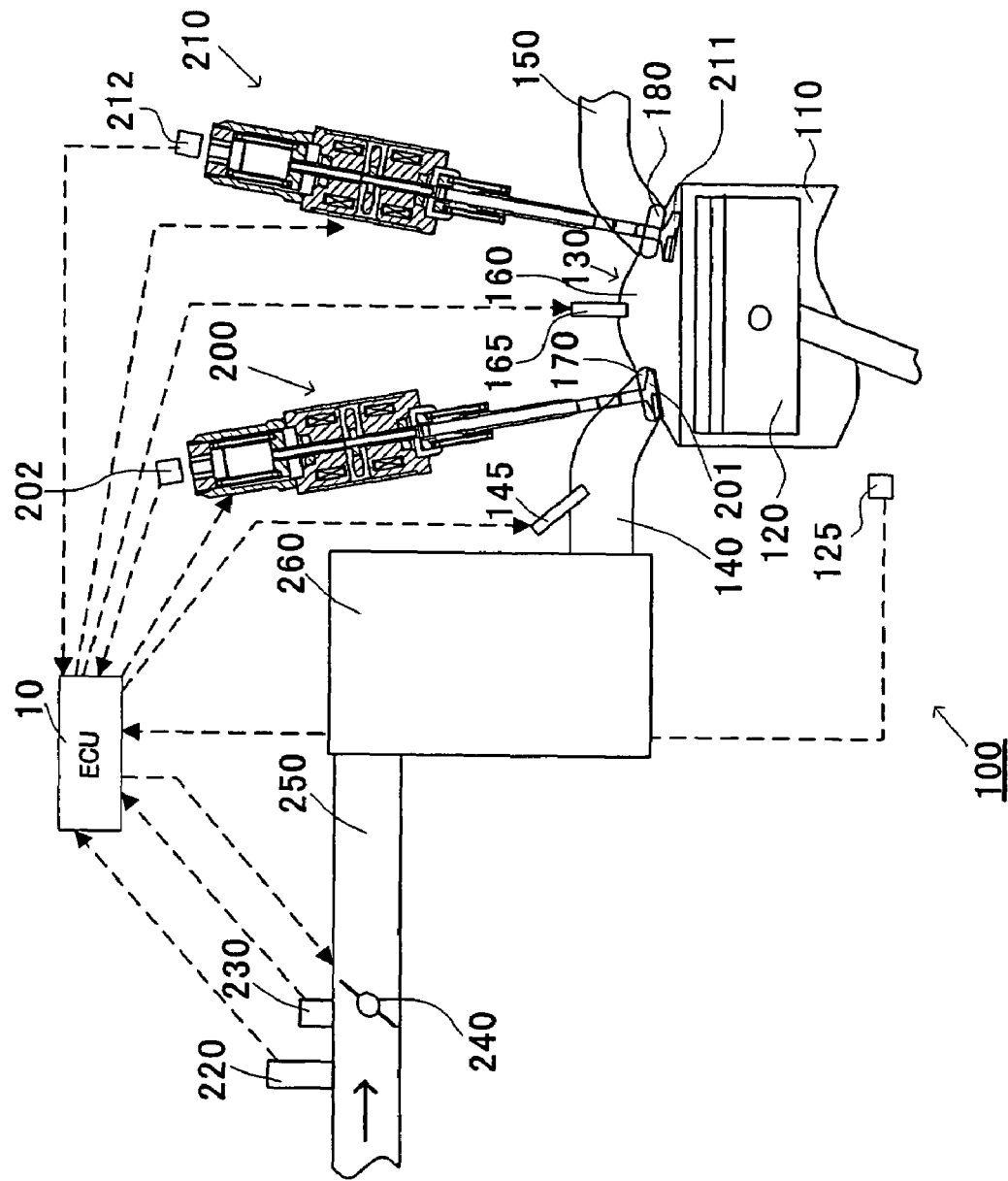
FIG. 1 is a cross sectional view schematically showing a control apparatus for controlling an electromagnetically driven valve and an internal combustion engine in an embodiment.

Firstly, the structures and the operations of the internal combustion engine and the control apparatus for controlling the electromagnetically driven valve in the embodiment will be explained with reference to FIG. 1 to FIG. 3. FIG. 1 schematically shows the control apparatus for controlling the electromagnetically driven valve and the internal combustion engine.

An internal combustion engine 100 associated with the embodiment shown in FIG. 1 is a gasoline internal combustion engine of a water-cooled type of the four-stroke-cycles which is fueled by gasoline and which is mounted on a vehicle, such as an automobile, and is a port-injection-type internal combustion engine for injecting fuel into a cylinder 110 from an intake port 140. Moreover, the internal combustion engine 100 associated with the embodiment has a layout having a plurality of cylinders 110. Each of the cylinders 110 is provided with: a fuel injection valve 145; an ignition plug 165; or the like, which will be described later. Incidentally, FIG. 1 shows one cylinder out of the plurality of cylinders, for convenience of explanation.

Particularly, in the internal combustion engine 100 provided with the electromagnetically driven valves, an intake air amount is continuously adjusted, from low-speed revolutions to high-speed revolutions, according to the individual number of revolutions, and a fuel injection amount is controlled according to the adjusted intake air amount and the detected number of engine revolutions. As described above, the intake air amount is adjusted or controlled by optimally adjusting the opening/closing characteristics of the electromagnetically driven valves according to operational conditions, such as the number of engine revolutions, the desired torque or the load, for example, and the normal operation of the internal combustion engine is performed. Here, the "opening/closing characteristics" are the operation of valve-opening and the operation of valve-closing of the electromagnetically driven valves, the valve opening or closing timing, the valve lift amount, or the valve lift amount and the valve lift period (the operating angle).

In FIG. 1, the internal combustion engine 100 is provided with: an Electronic Control Unit (ECU) 10; a crank angle sensor 125; the ignition plug 165; a lift sensor 202; a lift sensor 212; and elements in the intake system and elements in the exhaust system, which will be described later.

In FIG. 1, the intake system of the internal combustion engine 100 is constructed such that the air inhaled from a not-illustrated air duct for taking in the outside air, through an airflow meter 220 and an electronic control throttle valve 240 with a throttle position sensor 230, flows from an intake tube 250 to a surge tank 260, which has a function of preventing an intake pulse, and further flows through an intake port 140, which is provided with the fuel injection valve 145, to a combustion chamber 160, which is constructed from a bottom surface of a cylinder head 130, a top surface of a piston 120, and side walls of the cylinder 110. Incidentally, a valve body 201a and a valve seat (for intake) 170 of an electromagnetically driven intake valve 200, which function as an intake valve 201 for opening or closing the intake port 140, are disposed at an opening end portion on the combustion chamber 160 side of the intake port 140.

On the other hand, the exhaust system of the internal combustion engine 100 is constructed such that exhaust gases are emitted from the combustion chamber 160 in the cylinder 110 through an exhaust port 150, an exhaust tube, an exhaust gas purification catalyst, and a muffler, which are not illustrated, to the air. A valve body 211a and a valve seat (for exhaust) 180 of an electromagnetically driven exhaust valve 210, which function as an exhaust valve 211 for opening or closing the exhaust port 150, are disposed at an opening end portion on the combustion chamber 160 side of the exhaust port 150

The up-and-down sliding of the piston 120 inside the cylinder 110 formed for the internal combustion engine 100 in the embodiment is converted into a rotational motion of a not-illustrated crankshaft. The rotation angle of the crankshaft and the number of engine revolutions are measured with the crank angle sensor 125.

The combustion chamber 160 is provided with the ignition plug 165.

The internal combustion engine 100 in the embodiment is provided with two intake valves 201 and two exhaust valves 211 for each cylinder 110. Therefore, two electromagnetically driven intake valves 200 and two electromagnetically driven exhaust valves 210, which are incorporated in the cylinder head 130, are provided for each cylinder 110. The electromagnetically driven intake valve 200 and the electromagnetically driven exhaust valves 210 have the same structure.

Next, with reference to FIG. 2, the structures and the operations of the electromagnetically driven intake valve 200, the electromagnetically driven exhaust valves 210, and the ECU for controlling the electromagnetically driven valves will be explained. FIG. 2 schematically shows the electromagnetically driven valve and the ECU for controlling the electromagnetically driven valve.

Figure 2:
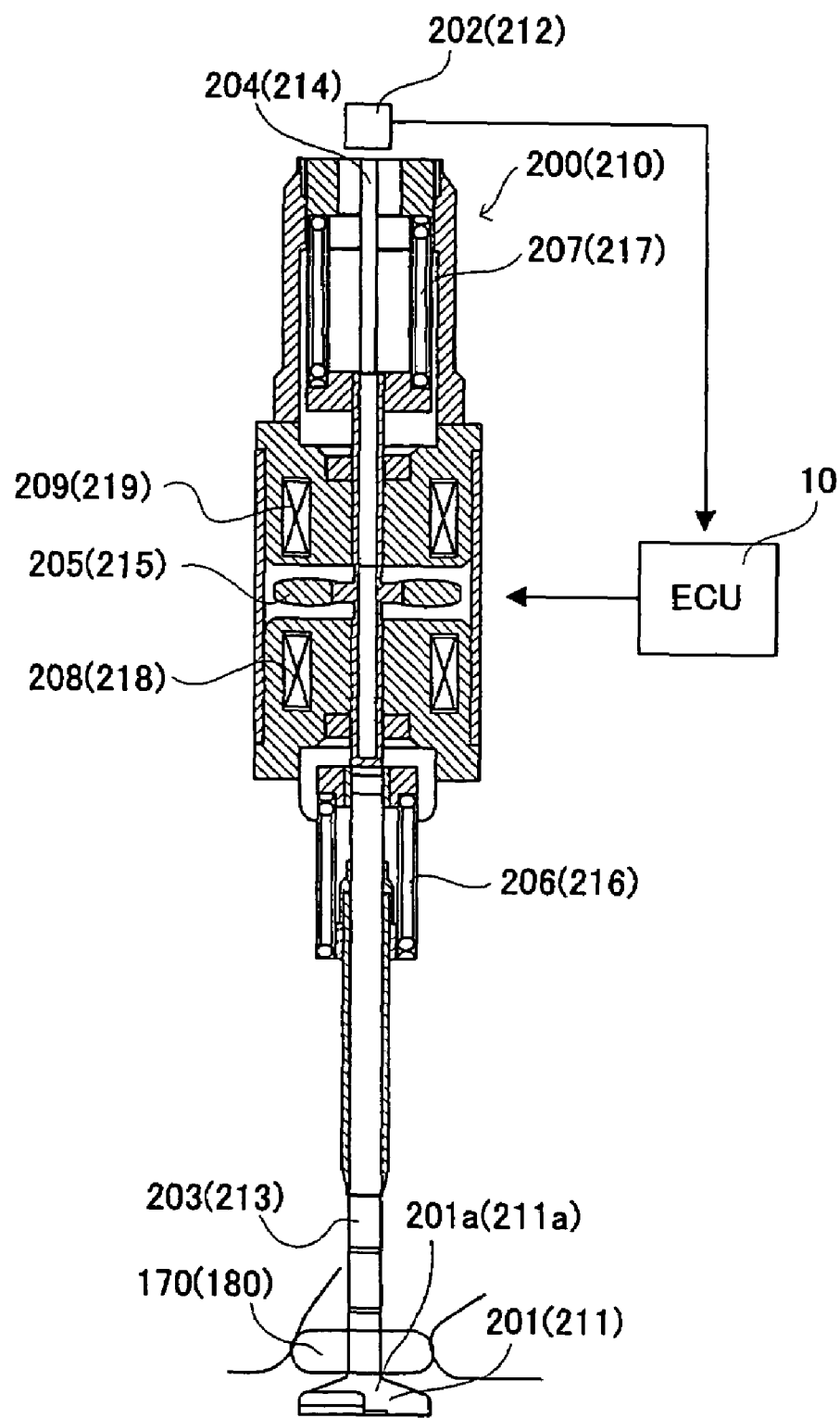
FIG. 2 is a cross sectional view schematically showing the electromagnetically driven valve associated with the embodiment and an Electronic Control Unit (ECU) for controlling the electromagnetically driven valve.

As shown in FIG. 2, with respect to the electromagnetically driven intake valve 200 (the electromagnetically driven exhaust valves 210), a plate-like movable needle 205 (215) made from a soft magnetic material is mounted on a valve shaft 203 (213) of the valve body 201a (211a). Elastic forces by a lower spring 206 (216) and an upper spring 207 (217) are applied to the movable needle 205 (215) to be at the neutral position. An electromagnetic coil 208 (218) for valve-opening is placed on the lower side of the movable needle 205 (215), and an electromagnetic coil 209 (219) for valve-closing is placed on the upper side.

Upon the valve-opening, after electricity to the electromagnetic coil 209 (219) for valve-closing on the upper side is stopped under the control of the ECU 10, electricity is turned on to the electromagnetic coil 208 (218) for valve-opening on the lower side. Then, the movable needle 205 (215) is adsorbed to the lower side by the generation of an electromagnetic force at the electromagnetic coil 208 (218) for valve-opening. By this, the valve body 201a (211a) is lifted up, i.e., detached or released from the valve seat 170 (180), which opens (connects) between the intake port 140 (the exhaust port 150) and the combustion chamber 160. On the contrary, upon the valve-closing, after electricity to the electromagnetic coil 208 (218) for valve-opening on the lower side is stopped under the control of the ECU 10, electricity is turned on to the electromagnetic coil 209 (219) for valve-closing on the upper side. Then, the movable needle 205 (215) is adsorbed to the upper side by the generation of an electromagnetic force at the electromagnetic coil 209 (219) for valve-closing. By this, the valve body 201a (211a) is seated onto the valve seat 170 (180), which closes (shutdowns) between the intake port 140 (the exhaust port 150) and the combustion chamber 160.

Moreover, a detection rod 204 (214) is engaged on the upper end of the valve shaft 203 (213) of the electromagnetically driven intake valve 200 (the electromagnetically driven exhaust valves 210), and the lift sensor 202 (212) is placed on the upper end of a housing. The lift sensor 202 (212) detects a displacement amount of the detection rod 204 (214) as the lift amount of the valve body 201a (211a). In addition to the above, a distance measurement sensor in a noncontact manner or the like by infrared rays, an ultrasonic wave, or the like, can be used as the lift sensor 202 (212).

Next, with reference to FIG. 2, the above-described step-out of the electromagnetically driven valve will be explained.

As shown in FIG. 2, when the opening or closing of the electromagnetically driven intake valve 200 (the electromagnetically driven exhaust valves 210) is driven, if the displacement amplitude of the electromagnetically driven valve decreases because of a temporarily increased friction resistance or the like, and if the electromagnetically driven valve cannot reach a valve-opening seat position or a valve-closing seat position, the electromagnetic force acting on the electromagnetically driven valve weakens, by which it is impossible to appropriately cooperate the electromagnetic force and the elastic force of the spring. The electromagnetically driven valve is maintained at the neutral position between the valve-opening and valve-closing seat positions by the lower spring 206 (216) and the upper spring 207 (217), detached from the valve seat 170 (180), and becomes always open by a constant amount.

Next, with reference to FIG. 3, the ECU 10 for controlling the operational condition of the internal combustion engine 100 in the normal driving case and in the abnormal case will be described. FIG. 3 conceptually shows (i) the ECU for controlling the electromagnetically driven valves, (ii) various sensors for inputting various detection signals and parameters to the ECU, and (iii) various valves controlled by the ECU or the like.

Figure 3:
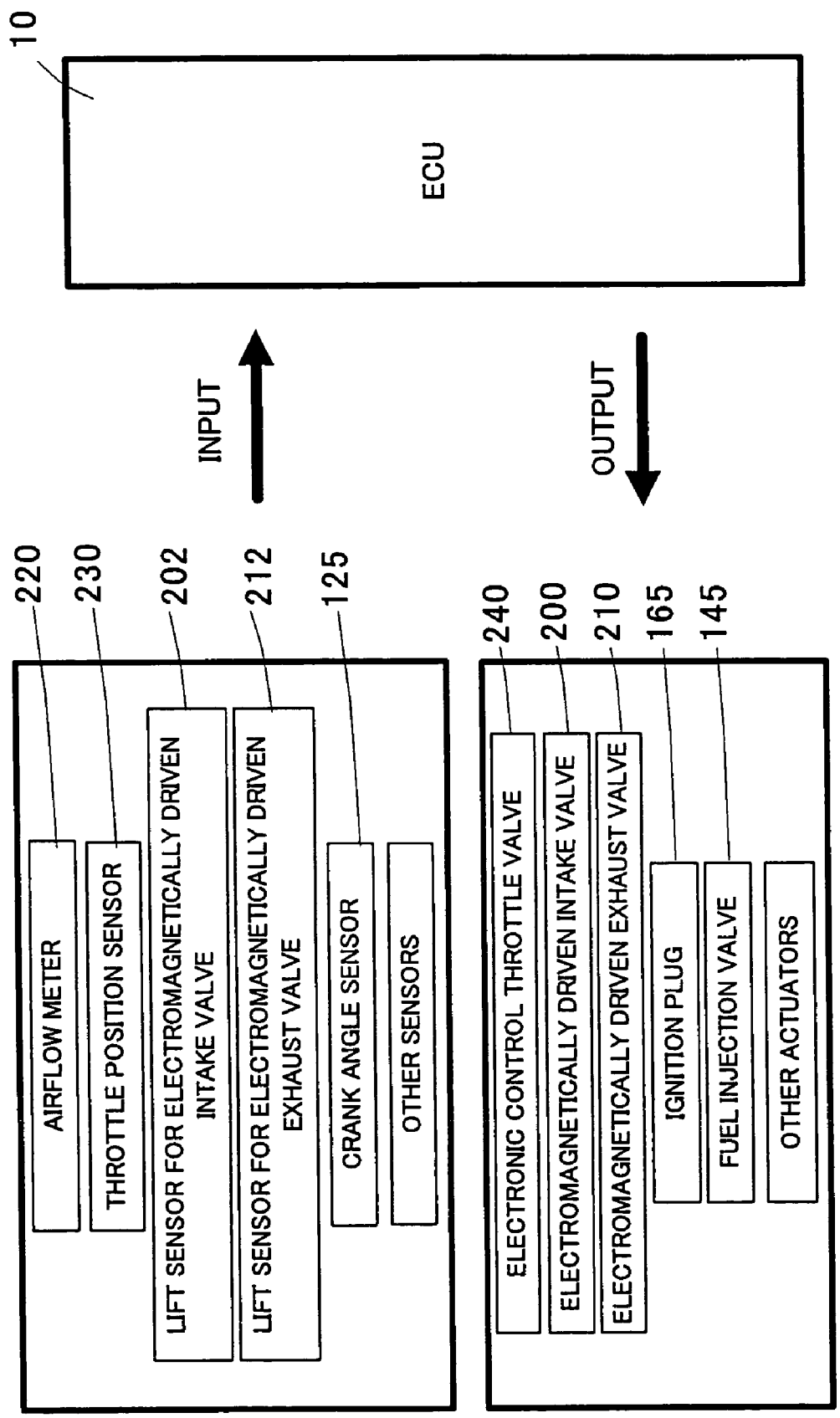

In FIG. 3, the ECU 10 is an arithmetic-logic circuit provided with: a Control Processing Unit (CPU); a Read Only Memory (ROM); a Random Access Memory (RAM); a backup RAM; and the like. The CPU overall controls the internal combustion engine in the normal driving case according to a program recorded on the ROM. Specifically, various sensors are connected to the ECU 10 via electric wiring. The various sensors are the above-described airflow meter 220, the throttle position sensor 230, the lift sensor 202 for the electromagnetically driven intake valve, the lift sensor 212 for the electromagnetically driven exhaust valve, the crank angle sensor 125, and not-illustrated other sensors, such as a water temperature sensor or the like. Moreover, the electronic control throttle valve 240, the electromagnetically driven intake valve 200, the electromagnetically driven exhaust valve 210, the ignition plug 165, the fuel injection valve 145, and other actuators are connected to the ECU 10 via electric wiring.

In the normal driving case, the ECU 10 generates predetermined types of various control signals, with the output signals (i.e. electrical signals) of the various sensors as input parameters for a program set in advance. The ECU 10 controls, with the various control signals, the opening of the electronic control throttle valve 240, the valve lift amount of the electromagnetically driven intake valve 200 and the electromagnetically driven exhaust valve 210, the lift period (i.e. the operating angle), and the opening or closing timing, the ignition timing of the ignition plug 165, the fuel injection amount and the fuel injection timing of the fuel injection valve 145, and the driven amount of other actuators.

Particularly in the embodiment, in the abnormal case, the ECU 10 detects, with the lift sensor 202 and 212, whether or not the electromagnetically driven intake valve 200 and the electromagnetically driven exhaust valve 210 can be seated for valve-opening on their valve-opening drive. If it is detected that they cannot be seated for valve-opening, the fail-safe processing, such as the prohibition of valve-closing drive and valve-opening drive, the prohibition of fuel injection, and the prohibition of ignition, is performed under the control of the ECU 10.

(First Fail-safe Processing)

Figure 4:
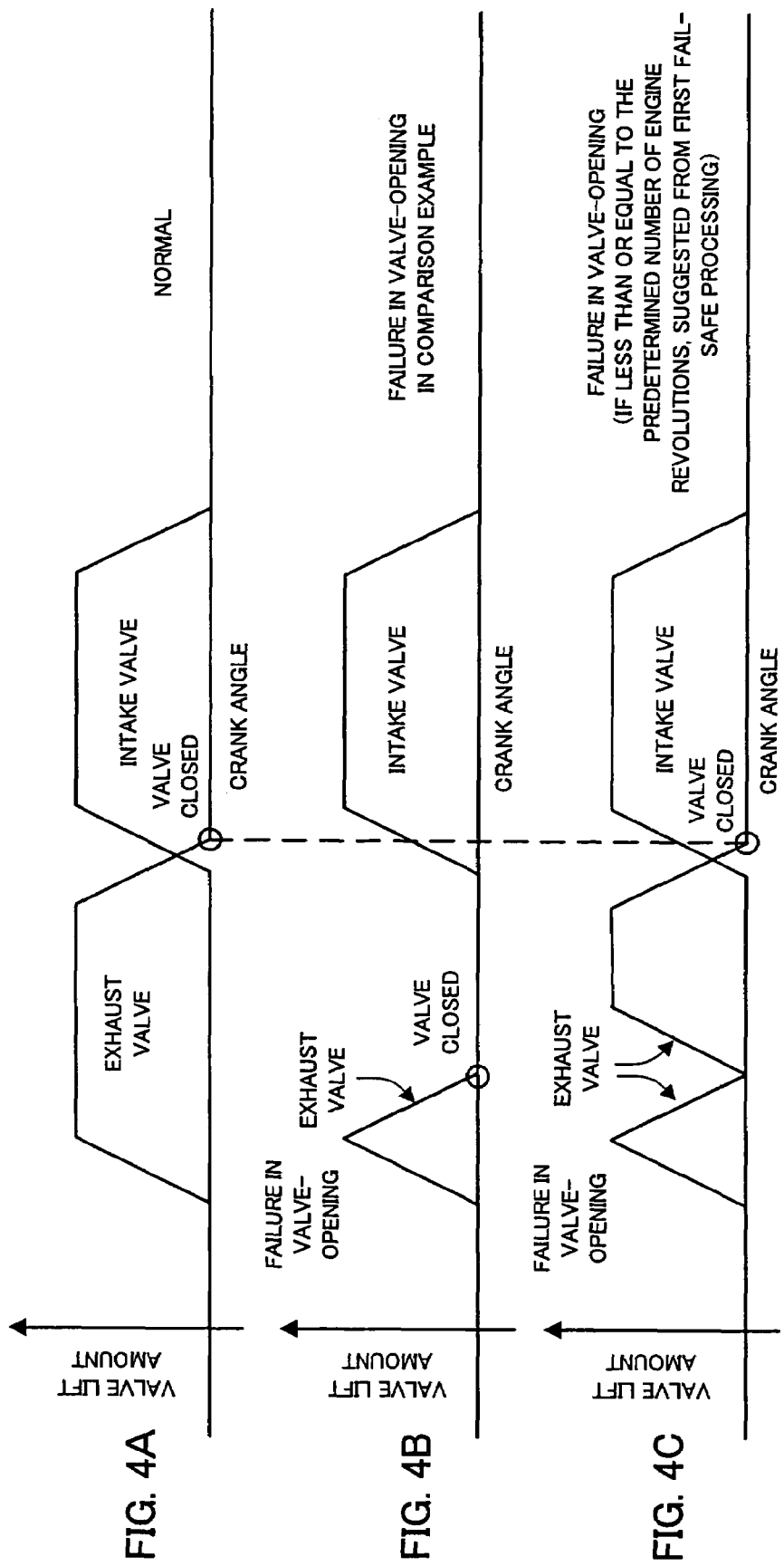
FIG. 4A to FIG. 4C are characteristic diagrams showing a valve lift amount and an operating angle with respect to a crank angle, in the normal case or the like of the electromagnetically driven valves of first fail-safe processing associated with the embodiment.

The first fail-safe processing associated with the embodiment will be explained with reference to FIG. 4 to FIG. 5. FIG. 4A shows the valve lift amount and the operating angle with respect to a crank angle, in the normal case of the exhaust valve 211 and the intake valve 201, which are driven by electromagnetism, in the first fail-safe processing associated with the embodiment. FIG. 4C shows the valve lift amount and the operating angle with respect to the crank angle, in the case of failing to open the exhaust valve 211 and the intake valve 201, which are driven by electromagnetism, in the first fail-safe processing associated with the embodiment, as in FIG. 4A. FIG. 4B shows the valve lift amount and the operating angle with respect to the crank angle, in the case of failing to open the exhaust valve 211 and the intake valve 201, which are driven by electromagnetism, associated with the fail-safe processing in a comparison example.

Firstly, with reference to FIG. 4A, the operation of valve-opening and the operation of valve-closing in the normal case of the exhaust valve 211 and the intake valve 201, which are driven by electromagnetism, will be explained. In FIG. 4A, the vertical axis shows the valve lift amount of the exhaust valve 211 and the intake valve 201, which are driven by electromagnetism. The horizontal axis shows a change in the crank angle with the passage of time. The exhaust valve 211 and the intake valve 201, which are driven by electromagnetism, are released from the fully closed position by the extinction of the electromagnetic force of the electromagnetic coil for valve-closing, under the control of the ECU 10. The exhaust valve 211 and the intake valve 201 are started to open (lift up in FIG. 4A) by the elastic force of the upper springs 217 and 207 and seated for valve-opening by the generation of the electromagnetic force of the electromagnetic coil for valve-opening. Then, under the control of the ECU 10, the exhaust valve 211 and the intake valve 201 are released from the fully opened position by the extinction of the electromagnetic force of the electromagnetic coil for valve-opening. The exhaust valve 211 and the intake valve 210 are started to close by the elastic force of the lower springs 216 and 206 and seated for valve-closing by the generation of the electromagnetic force of the electromagnetic coil for valve-closing.

Next, with reference to FIG. 4B, a comparison example for the embodiment will be explained. In the comparison example, as in the embodiment, only the operation of valve-closing of the electromagnetically driven valves is performed as the fail-safe processing. More specifically, as the fail-safe processing, if the exhaust valve 211 driven by electromagnetism is opened and fails in the seating for valve-opening, it is only performed that the exhaust valve 211 is closed and maintained in the fully closed position. In this case, air is not exhausted sufficiently and a large amount of burned gas (combustion gas) is left in the cylinder, and the burned gas is compressed. Thus, when the intake valve 201 driven by electromagnetism is opened, since a pressure in the cylinder is high, the intake valve 201 driven by electromagnetism receives a force in the direction of preventing the valve-opening, which conceivably causes the step-out without normally opening the intake valve 201 driven by electromagnetism. Even if it is succeeded to open the intake valve 201 driven by electromagnetism, it is also conceivable that new air and fuel are not inhaled sufficiently because of the large amount of burned gas left, and that after the subsequent compression stroke, the air/fuel mixture is not burned. Moreover, in the comparison example, as the fail-safe processing, if the intake valve 201 driven by electromagnetism is opened and fails in the seating for valve-opening, it is only performed that the intake valve 201 is closed and maintained in the fully closed position. In this case, air is not inhaled sufficiently, the intake air amount into the cylinder becomes small, a ratio of the residual gas that is not exhausted increases relatively excessively, and the air/fuel mixture is not burned sufficiently. The air/fuel mixture including a large amount of unburned fuel, in other words, raw gas, is exhausted without sufficient purification by a catalyst or the like, which possibly deteriorates the exhaust emissions. In the same manner, the intake air amount into the cylinder is small, a ratio of fuel increases relatively, an air/fuel ratio becomes small, and the air/fuel mixture is not burned sufficiently. The air/fuel mixture including a large amount of unburned fuel, in other words, raw gas, is exhausted without sufficient purification by a catalyst or the like, which possibly deteriorates the exhaust emissions. Moreover, since the intake air amount into the cylinder is small, it is also conceivable that sufficient combustion is not performed and that the required engine torque is not generated.

Next, with reference to FIG. 4A if needed, in addition to FIG. 4C, the fail-safe processing associated with the embodiment will be explained.

In the first fail-safe processing associated with the embodiment, which is the developed fail-safe processing in the comparison example, the number of engine revolutions is relatively low (low-speed revolutions) in order to sufficiently obtain the exhaust efficiency and the intake efficiency. At the same time, if it is less than or equal to the above-described predetermined number of engine revolutions, the exhaust valve 211 or the intake valve 201, which are driven by electromagnetism, is again opened and seated for valve-opening in the same stroke under the control of the ECU 10, and the final valve-closing timing of the exhaust valve 211 or the intake valve 201 in the same stroke is set to the same timing as in the normal case. Here, the "predetermined number of engine revolutions" associated with the embodiment is the above-described "number of engine revolutions set in advance as being a predetermined threshold value". More specifically, with respect to the electromagnetically driven valve, the time length required for the operation of valve-opening and the time length required for the operation of valve-closing are unrelated to the number of engine revolutions, and mostly determined from mass of the movable needle of the electromagnetically driven valve and spring constants of the upper spring and the lower spring. For example, it is substantially constant, such as about 3 msec. On the other hand, a period in which the electromagnetically driven valve is open (i.e. the operating angle), in other words, a time length in which the electromagnetically driven valve is open tends to decrease in accordance with the increase in the number of engine revolutions, in order to improve the output of the internal combustion engine and fuel efficiency. Thus, as the number of engine revolutions is increased, the time length in which the electromagnetically driven valve is open decreases. With the certain number of engine revolutions as a critical point, it is impossible, in terms of time, to close the electromagnetically driven valve that is once opened and fails in the seating for valve-opening in the same stroke, maintain it in the fully closed position, again open it, and close it and seat it for valve-closing at the same timing as in the normal case. The certain number of engine revolutions which is the critical point is defined as the "predetermined number of engine revolutions (predetermined threshold value)".

Particularly, if the number of engine revolutions is relatively low (low-speed revolutions), it is extremely useful to match the valve-closing timing in the same stroke of the exhaust valve 211 or the intake valve 201 with the valve-closing timing in the normal case, as described above, in terms of inhibiting the reduction of the intake efficiency, in addition to or in place of the exhaust efficiency.

Namely, in the first fail-safe processing associated with the embodiment, if the number of engine revolutions is relatively low (low-speed revolutions) and less than or equal to the predetermined number of engine revolutions, the exhaust valve 211 or the intake valve 201 is opened again as shown in FIG. 4C even if it once fails in the seating for valve-opening, and opened at the same timing as in the normal case shown in FIG. 4A. Thus, it is possible to obtain substantially the same exhaust efficiency or the intake efficiency as in the normal case, and it is possible to realize the fail-safe processing which does not have an influence of the failure in the seating for valve-opening on a next stroke.

Particularly in the embodiment, the ECU 10, which constructs one example of the control apparatus of the electromagnetically driven valve of the internal combustion engine 100, is constructed to perform the different fail-safe processing according to the number of engine revolutions or the like of the internal combustion engine 100 if the electromagnetically driven valve is opened and fails in the seating for valve-opening.

Hereinafter, with reference to FIG. 5, the first fail-safe processing according to the number of engine revolutions, which is controlled by the ECU 10 in the embodiment, will be explained. FIG. 5 shows a first fail-safe processing routine associated with the embodiment. The first fail-safe processing routine is a routine stored in advance in the ROM of the ECU 10 and performed mainly by the ECU 10 regularly or irregularly during the operation of the internal combustion engine 100.

Figure 5:
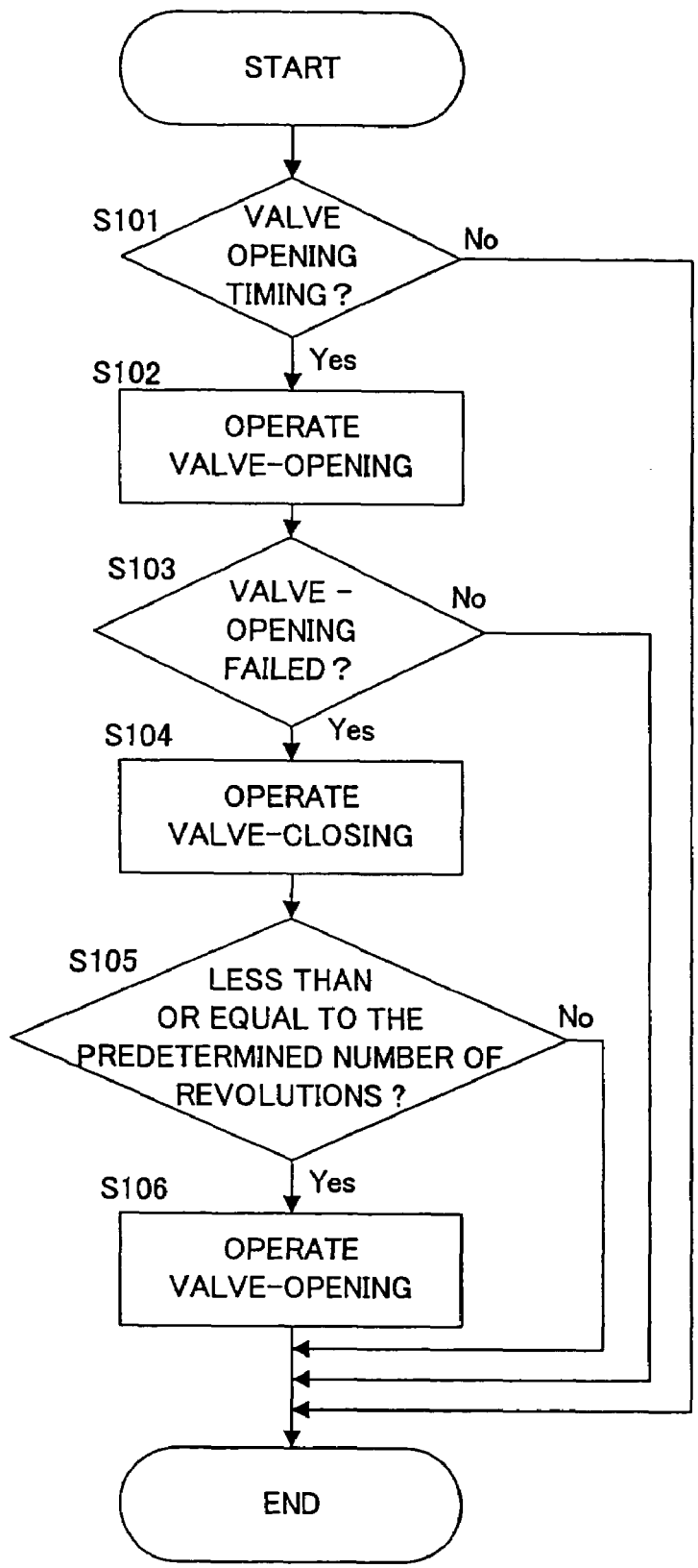
FIG. 5 is a flowchart showing a first fail-safe processing routine associated with the embodiment.

In FIG. 5, at first, it is judged or determined by the ECU 10 whether or not it is the valve-opening timing of the electromagnetically driven valve (step S101). Such judgment is performed on the ECU 10, with the output signal of the crank angle sensor 125 as an input parameter, for example. If it is judged to be the valve-opening timing of the electromagnetically driven valve (the step S101: Yes), the valve-opening of the electromagnetically driven valve is operated (step S102).

Then, it is judged whether or not the electromagnetically driven valve fails in the valve-opening (step S103). Specifically, it is judged whether or not the exhaust valve 211 or the intake valve 201 fails in the seating for valve-opening. Such judgment is performed on the ECU 10, with the output signals of the lift sensor 212 and 202 as input parameters. If it is judged that the electromagnetically driven valve fails in the valve-opening (the step S103: Yes), the valve-closing of the electromagnetically driven valve is operated (step S104).

Then, under the control of the ECU 10, it is judged whether or not the number of engine revolutions detected by the engine revolutions detecting device is less than or equal to the predetermined number of revolutions calculated by a predetermined engine revolutions calculating device (step S105). If it is judged that the number of engine revolutions is less than or equal to the predetermined number of revolutions (the step S105: Yes), the valve-opening of the electromagnetically driven valve is operated again (step S106).

On the other hand, the performance of the fail-safe processing routine is once ended in the following cases: if it is judged not to be the valve-opening timing of the electromagnetically driven valve as a result of the judgment in the step S101 (the step S101: No); if it is judged that the electromagnetically driven valve succeeds in the valve-opening as a result of the judgment in the step S103 (the step S103: No); and if it is judged that the number of engine revolutions is greater than the predetermined number of revolutions as a result of the judgment in the step S105 (the step S105: No).

(Second Fail-safe Processing)

The second fail-safe processing associated with the embodiment will be explained below with reference to FIG. 6 to FIG. 8.

If the number of engine revolutions is relatively high (high-speed revolutions), even if the exhaust valve 211 driven by electromagnetism fails in the seating for valve-opening, is closed, then opened again, and closed at the same timing as in the normal case by performing the above-described first fail-safe processing associated with the embodiment, it is hardly possible or completely impossible to remove the influence on the next stroke. Namely, if the number of engine revolutions is relatively high (high-speed revolutions), the failure in the seating for valve-opening of the exhaust valve 211 driven by electromagnetism influences the amount of the burned gas remained in the cylinder. The amount of the burned gas remained in the cylinder remarkably influences the success or failure in the valve-opening of the intake valve 201 driven by electromagnetism in the intake stroke following the exhaust stroke, and the success or failure in ignition and combustion after the subsequent compression stroke.

Then, in the second fail-safe processing associated with the embodiment, if the number of engine revolutions is relatively high (high-speed revolutions), and if the electromagnetically driven exhaust valve fails in the seating for valve-opening, the degree of completion of the exhaust stroke is judged by directly measuring the above-described actual product of the opening area and time of the electromagnetically driven exhaust valve. By understanding, from the judgment result, the influence on the valve-opening of the electromagnetically driven intake valve caused by the large or small amount of burned gas remained in the cylinder, it is possible to perform the appropriate fail-safe processing.

Firstly, with reference to FIG. 6A, FIG. 6B, and FIG. 6C, the amount of the burned gas remained in the cylinder, the cylinder pressure, and the operations of the exhaust valve 211 and the intake valve 201, which are driven by electromagnetism, in the normal case of the exhaust valve 211 driven by electromagnetism and in the case of failing to seat for valve-opening, in the second fail-safe processing associated with the embodiment, will be explained.

Figure 6A:
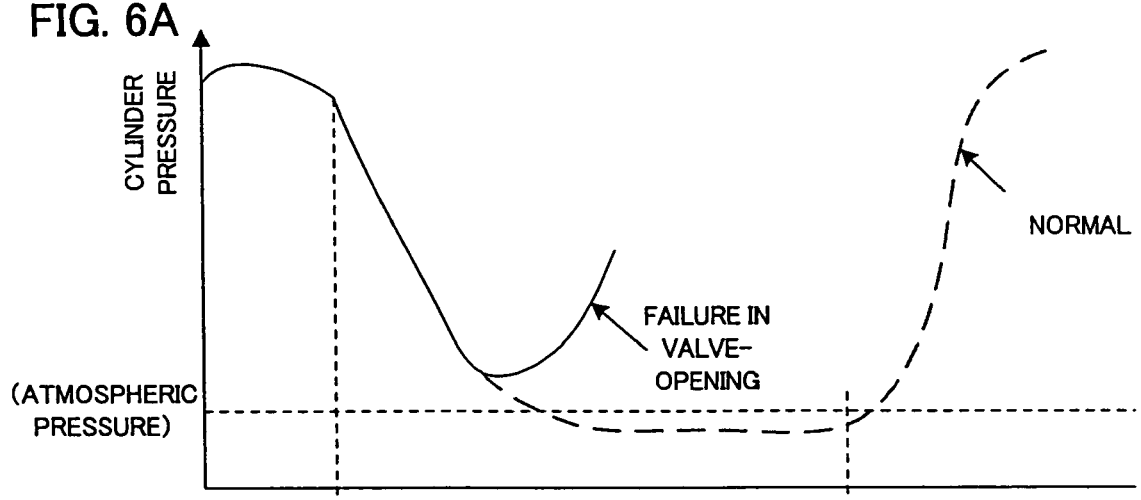
FIG. 6A to FIG. 6C are characteristic diagrams showing a cylinder pressure with respect to the crank angle, in the normal case or the like associated with the embodiment.

FIG. 6A shows a change in the cylinder pressure with respect to the crank angle, in the normal case of the exhaust valve 211 driven by electromagnetism and in the case of failing to seat for valve-opening. FIG. 6B shows a change in the valve lift amount with respect to the crank angle, in the normal case of the exhaust valve 211 and the intake valve 201, which are driven by electromagnetism. FIG. 6C shows a change in the valve lift amount with respect to the crank angle, in the case where the exhaust valve 211 driven by electromagnetism fails in the seating for valve-opening, in the second fail-safe processing associated with the embodiment.

In FIG. 6A, the vertical axis shows the cylinder pressure. In FIG. 6B and FIG. 6C, the vertical axis shows the valve lift amount with respect to the crank angle of the exhaust valve 211 and the intake valve 201, which are driven by electromagnetism. Incidentally, in order to simplify the explanation, it is assumed that there is only one valve for one cylinder out of the exhaust valve 211 and the intake valve 201, which are driven by electromagnetism.

Figure 6B:
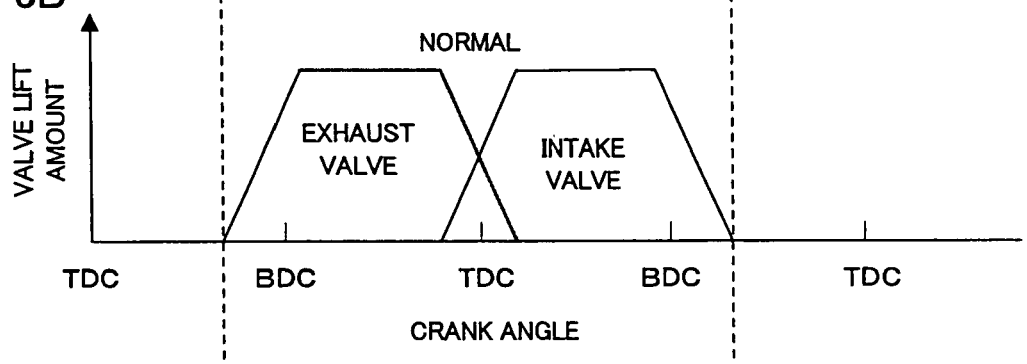
Figure 6C:
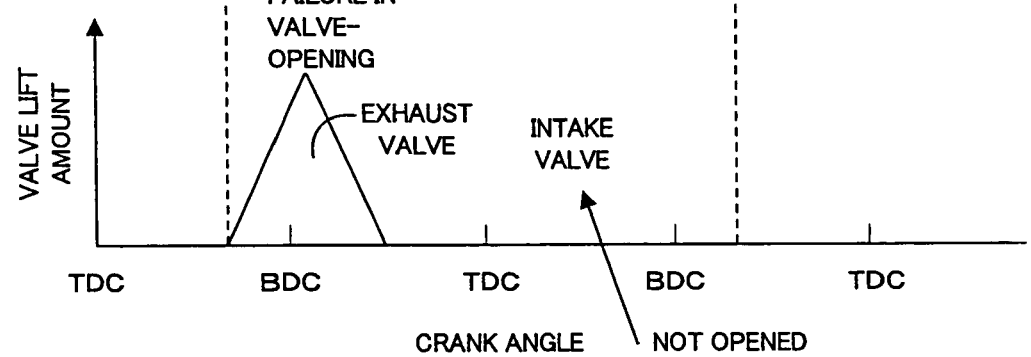

With reference to FIG. 6A and FIG. 6B, (i) a condition in the cylinder in the normal case where the exhaust valve 211 driven by electromagnetism succeeds in the seating for valve-opening and (ii) the valve lift amount with respect to the crank angle of the exhaust valve 211 and the intake valve 201, which are driven by electromagnetism succeeds in the seating for valve-opening, will be explained. As the exhaust valve 211 driven by electromagnetism is started to open, the burned gas (combustion gas) in the cylinder is exhausted more, and the pressure in the cylinder decreases to the substantial atmospheric pressure. Then, the intake valve 201 driven by electromagnetism is opened against the cylinder pressure which is equal to the atmospheric pressure. Then, after the passage of a time length of valve-overlapping in which the exhaust valve 211 and the intake valve 201, which are driven by electromagnetism, are both opened, the exhaust valve 211 driven by electromagnetism is closed. In the meantime, the cylinder pressure is maintained to be substantially equal to the atmospheric pressure. Then, the cylinder pressure increases, with the valve-closing of the intake valve 201 driven by electromagnetism as a start.

Next, with reference to FIG. 6A and FIG. 6C, (i) a condition in the cylinder in the case where the exhaust valve 211 driven by electromagnetism fails in the seating for valve-opening and (ii) the second fail-safe processing in the embodiment corresponding to the condition will be explained. If the number of engine revolutinos is high (high-speed revolutions), and if the exhaust valve 211 driven by electromagnetism fails in the seating for valve-opening and is closed and maintained in the fully closed position under the condition that the burned gas (combustion gas) remains in the cylinder, then the burned gas is compressed to a Top Dead Center (TDC) of the start of the intake stroke, and the cylinder pressure increases until the valve-opening timing of the intake valve 201 driven by electromagnetism. The valve area size of the intake valve 201 driven by electromagnetism in contract with the inside of the cylinder is larger than that of the exhaust valve 211 driven by electromagnetism. Thus, if the valve-opening is attempted, the intake valve 201 receives a pressure from the inside of the cylinder in the direction to prevent the valve-opening, which increases a possibility to fail in the seating for valve-opening.

More specifically, if the amount of the burned gas remained in the cylinder is large, the large amount of burned gas remained in the cylinder is compressed, and the cylinder pressure becomes high. If the cylinder pressure is high, the intake valve 201 driven by electromagnetism receives a pressure from the inside of the cylinder in the direction to prevent the valve-opening, which further increases a possibility to fail in the seating for valve-opening. Moreover, the large amount of burned gas remained in the cylinder prevents the intake of new air in the intake stroke, which further increases a possibility to fail in combustion after the subsequent compression stroke.

In the second fail-safe processing associated with the embodiment, if the exhaust valve 211 driven by electromagnetism fails in the seating for valve-opening, the degree of completion of the exhaust stroke is judged by directly measuring the above-described actual product of the opening area and time of the exhaust valve 211 driven by electromagnetism. On the basis of the judgment result, it is judged whether or not the intake valve 201 driven by electromagnetism is opened in the subsequent intake stroke. Specifically, if the exhaust valve 211 driven by electromagnetism fails in the seating for valve-opening, the exhaust valve 211 driven by electromagnetism is closed and maintained in the fully closed position, under the control of the ECU 10. Then, under the control of the ECU 10, an actual product "A1" of the opening area and time and a target product "A2" of the opening area and time are compared. Then, under the control of the ECU 10, if the actual product "A1" of the opening area and time is less than the target product "A2" of the opening area and time as a result of the comparison between them, the valve-opening of the intake valve 201 driven by electromagnetism is stopped and not performed in the intake stroke because even if opened, the intake valve 201 driven by electromagnetism highly possibly fails in the seating for valve-opening. If the actual product "A1" of the opening area and time is greater than or equal to the target product "A2" of the opening area and time, the intake valve 201 driven by electromagnetism is opened and closed in the same manner as in the normal case.

Next, with reference to FIG. 7, the target product "A2" of the opening area and time, which is a criterion for judgment or determination in judging the degree of completion of the exhaust stroke by directly measuring the above-described actual product of the opening area and time, in the second fail-safe processing in the embodiment explained in FIG. 6 will be explained. FIG. 7 is a parameter table for determining the target product "A2" of the opening area and time, which is a criterion for judgment or determination in the second fail-safe processing associated with the embodiment.

Figure 7:
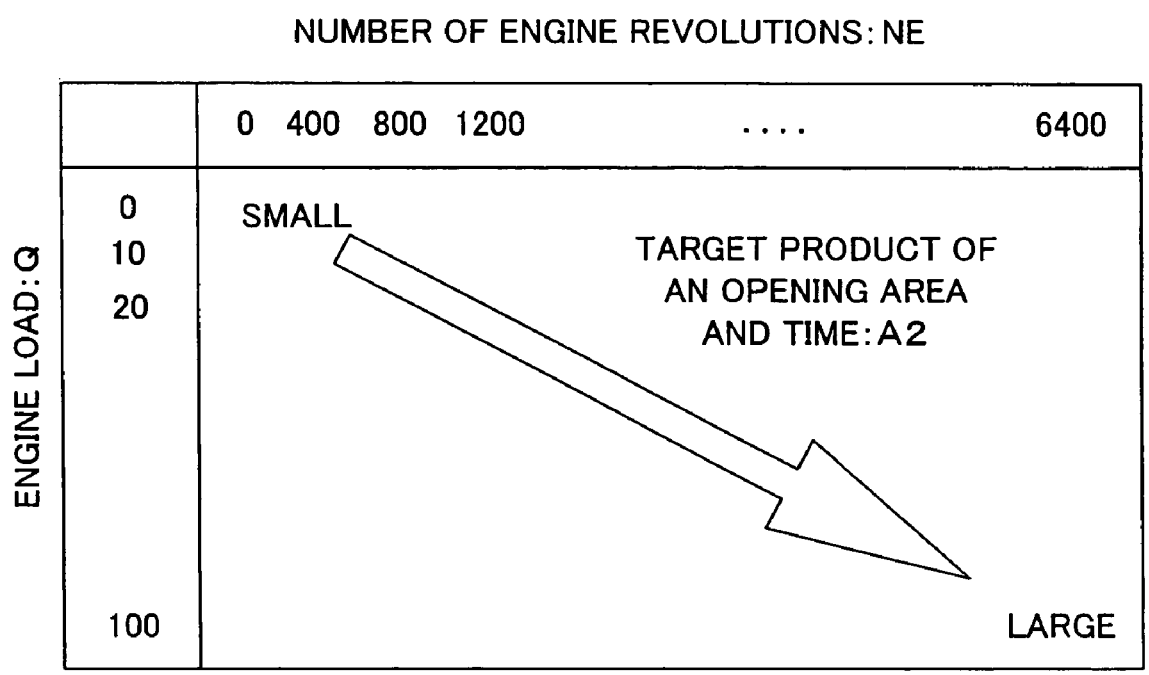
FIG. 7 is a parameter table for determining a target product "A2" of the opening area and time, which is a criterion for judgment or determination in second fail-safe processing associated with the embodiment.

The horizontal axis of the parameter table in FIG. 7 shows the number of engine revolutions "NE", and the vertical axis shows an engine load amount "Q" which is proportional to an initial amount of the burned gas. Under the control of the ECU 10, the target product "A2" of the opening area and time is determined with both the number of engine revolutions "NE" and the engine load amount "Q", as parameters. Specifically, if the engine load amount "Q" is large, the initial amount of the burned gas is large, and the target product "A2" of the opening area and time, which is intended to exhaust the large amount of the burned gas, is also large. In the same manner, if the number of engine revolutions "NE" is high (high-speed revolutions), the amount of the burned gas is large, and the target product "A2" of the opening area and time, which is intended to exhaust the large amount of the burned gas, is also large. Incidentally, such determination can be quickly performed by using, for example, a predetermined function or the parameter table for defining a relationship among the number of engine revolutions "NE", the engine load amount "Q", and the target product "A2" of the opening area and time, which is set and stored in advance in a built-in memory of the ECU 10 or the like.

Incidentally, if there are a plurality of the exhaust valves 211 driven by electromagnetism, the target product "A2" of the opening area and time may be adjusted by the number of the exhaust valves 211 driven by electromagnetism that fail in the seating for valve-opening, under the control of the ECU 10. In FIG. 7, the vertical axis shows the engine load amount "Q", which is proportional to the initial amount of the burned gas, with a load factor (%), but the same effect can be obtained even with a fuel injection amount "τ" (msec).

Figure 8:
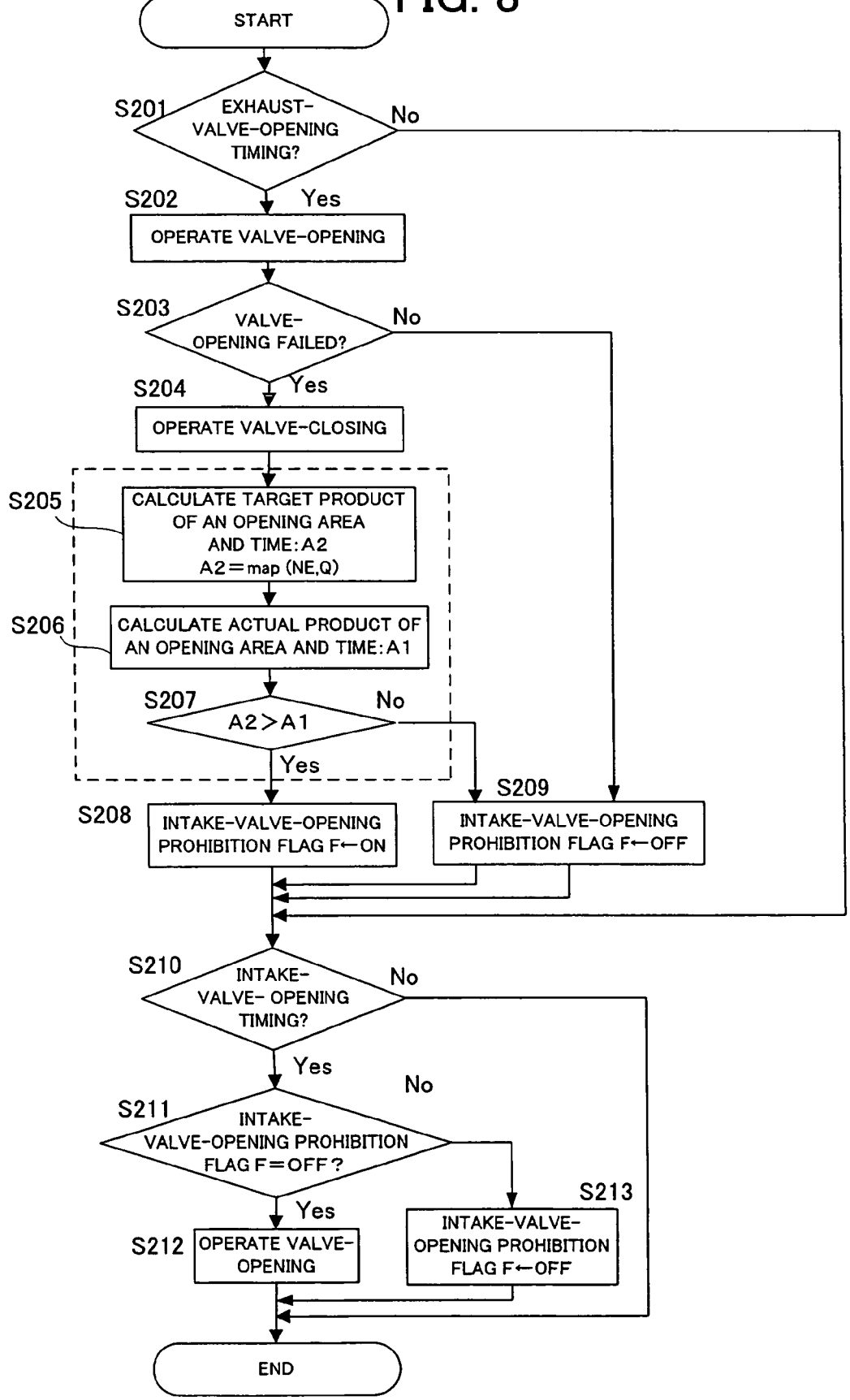
FIG. 8 is a flowchart showing a second fail-safe processing routine associated with the embodiment.

With reference to FIG. 8, the second fail-safe processing according to the actual product of the opening area and time of the exhaust valve 211 driven by electromagnetism, which is controlled by the ECU 10 in the embodiment, will be explained. FIG. 8 shows a second fail-safe processing routine associated with the embodiment. The second fail-safe processing routine is performed mainly by the ECU 10, and the structure of the ECU 10 or the like is the same as that in the first fail-safe processing routine.

In FIG. 8, at first, it is judged by the ECU 10 whether or not it is the valve-opening timing of the exhaust valve 211 driven by electromagnetism (step S201). Such judgment is the same as in the first fail-safe processing. If it is judged to be the valve-opening timing of the exhaust valve 211 driven by electromagnetism (the step S201: Yes), the valve-opening of the exhaust valve 211 driven by electromagnetism is operated (step S202).

Then, it is judged whether or not the exhaust valve 211 driven by electromagnetism fails in the valve-opening (step S203). Such judgment is the same as in the first fail-safe processing. If it is judged that the exhaust valve 211 driven by electromagnetism fails in the valve-opening (the step S203: Yes), the valve-closing of the exhaust valve 211 driven by electromagnetism is operated (step S204).

Then, under the control of the ECU 10, the target product "A2" of the opening area and time is determined by a calculating device for calculating a target product of the opening area and time, with both the number of engine revolutions "NE" and the engine load amount "Q", as parameters (step S205). Then, under the control of the ECU 10, the actual product "A1" of the opening area and time is measured by the ECU 10 from a time length in which the exhaust valve 211 driven by electromagnetism is actually open and from the valve lift amount (step S206).

Then, under the control of the ECU 10, the actual product "A1" of the opening area and time obtained in the step S205 and the target product "A2" of the opening area and time obtained in the step S206 are compared (step S207). If the actual product "A1" of the opening area and time is less than the target product "A2" of the opening area and time (step S207: Yes), "On" is substituted into a valve-opening prohibition flag "F" for the intake valve (step S208).

On the other hand, if the actual product "A1" of the opening area and time is greater than or equal to the target product "A2" of the opening area and time as a result of the comparison in the step S207 (step S207: No), and if it is judged that the exhaust valve 211 driven by electromagnetism succeeds in the valve-opening as a result of the judgment in the step S203 (the step S203: No), "Off" is substituted into the valve-opening prohibition flag "F" for the intake valve (step S209).

Then, it is judged whether or not it is the valve-opening timing of the intake valve 201 driven by electromagnetism (step S210). If it is judged to be the valve-opening timing of the intake valve 201 driven by electromagnetism (the step S210: Yes), it is further judged whether or not the valve-opening prohibition flag "F" for the intake valve is "Off" (step S211). If it is judged that the valve-opening prohibition flag "F" for the intake valve is "Off" (the step S211: Yes), the valve-opening of the intake valve 201 driven by electromagnetism is operated (step S212).

On the other hand, if it is judged that the valve-opening prohibition flag "F" for the intake valve is "On" as a result of the judgment in the step S211 (the step S211: No), the valve-opening of the intake valve 201 driven by electromagnetism in the step S212 is omitted, and "Off" is substituted into the valve-opening prohibition flag "F" for the intake valve (step S213).

On the other hand, if it is judged not to be the valve-opening timing of the exhaust valve 211 driven by electromagnetism as a result of the judgment in the step S201 (the step S201: No), it is judged whether or not it is the valve-opening timing of the intake valve 201 driven by electromagnetism (the step S210).

On the other hand, if it is judged not to be the valve-opening timing of the intake valve 201 driven by electromagnetism as a result of the judgment in the step S210 (the step S210: No), the performance of the fail-safe processing routine is once ended.

(Third Fail-safe Processing)

Next, the third fail-safe processing associated with the embodiment will be explained with reference to FIG. 9 and FIG. 10

In the third fail-safe processing associated with the embodiment, such fail-safe processing that the above-described second fail-safe processing is further developed is performed. Specifically, the second fail-safe processing is (i) such that if it is detected that the exhaust valve 211 driven by electromagnetism fails in the seating for valve-opening, the exhaust valve 211 driven by electromagnetism is closed and maintained in the fully closed position under the control of the ECU 10, and (ii) such that if it is judged that the actual product "A1" of the opening area and time of the exhaust valve 211 driven by electromagnetism in the cylinder in the same cycle is less than the target product "A2" of the opening area and time, the valve-opening of the intake valve 201 driven by electromagnetism in the same cycle is stopped and not performed. In the third fail-safe processing, fuel injection and ignition in the cylinder are stopped only once after the determination to stop the valve-opening of the intake valve 201 driven by electromagnetism. After the valve-opening of the exhaust valve 211 driven by electromagnetism in a next cycle, the electromagnetically driven valves are controlled in the same manner as in the normal case. Incidentally, the N-th cycle is defined as an N cycle in the embodiment.

Firstly, with reference to FIG. 9A, FIG. 9B, and FIG. 9C, the operations of the exhaust valve 211 and the intake valve 201, which are driven by electromagnetism, the fuel injection valve 145, and the ignition plug 165, in the normal case of the exhaust valve 211 driven by electromagnetism and in the case of failing to seat for valve-opening of the exhaust valve 211 driven by electromagnetism in the third fail-safe processing associated with the embodiment will be explained.

In the embodiment, as explained below, one example of the "fuel injection valve" associated with the present invention is constructed from the fuel injection valve 145. On the other hand, one example of the "ignition plug" associated with the present invention is constructed from the ignition plug 165.

Figure 9A:
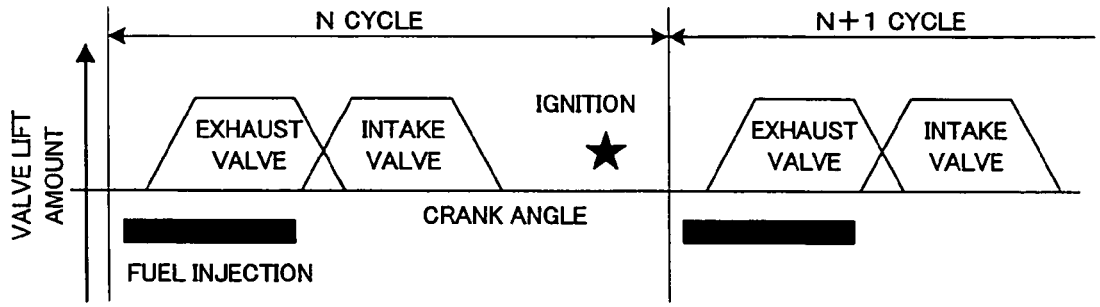
FIG. 9A to FIG. 9C are characteristic diagrams showing the valve lift amount and the operating angle with respect to the crank angle, in the normal case or the like of the electromagnetically driven valves associated with the embodiment.

FIG. 9A shows the valve lift amount with respect to the crank angle, in the normal case of the exhaust valve 211 and the intake valve 201, which are driven by electromagnetism. FIG. 9B shows the valve lift amount with respect to the crank angle, in the case (i) where it is determined to stop the valve-opening of the intake valve 201 driven by electromagnetism when the exhaust valve 211 driven by electromagnetism fails in the seating for valve-opening and (ii) where fuel is injected upon the determination, which is one example of the third fail-safe processing associated with the embodiment. FIG. 9C shows the valve lift amount with respect to the crank angle, in the case (i) where it is determined to stop the valve-opening of the intake valve 201 driven by electromagnetism when the exhaust valve 211 driven by electromagnetism fails in the seating for valve-opening and (ii) where fuel is not injected upon the determination, which is another example of the third fail-safe processing associated with the embodiment.

Figure 9B:
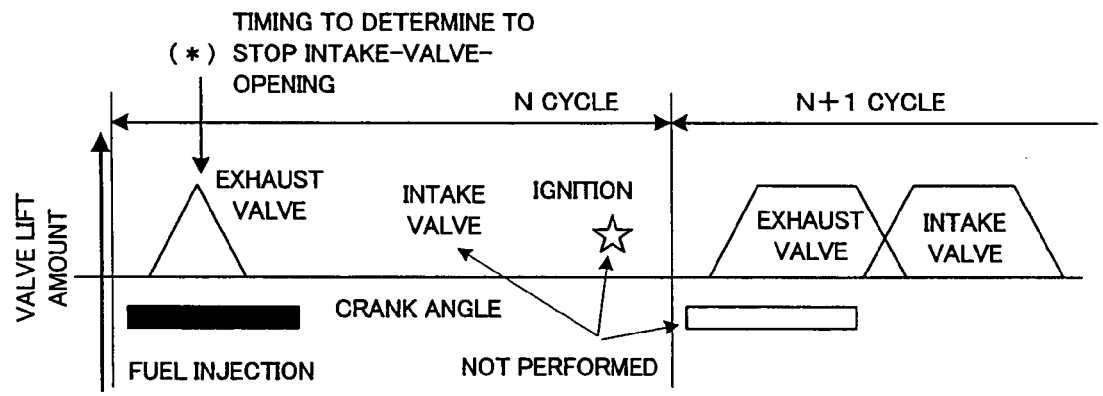
Figure 9C:
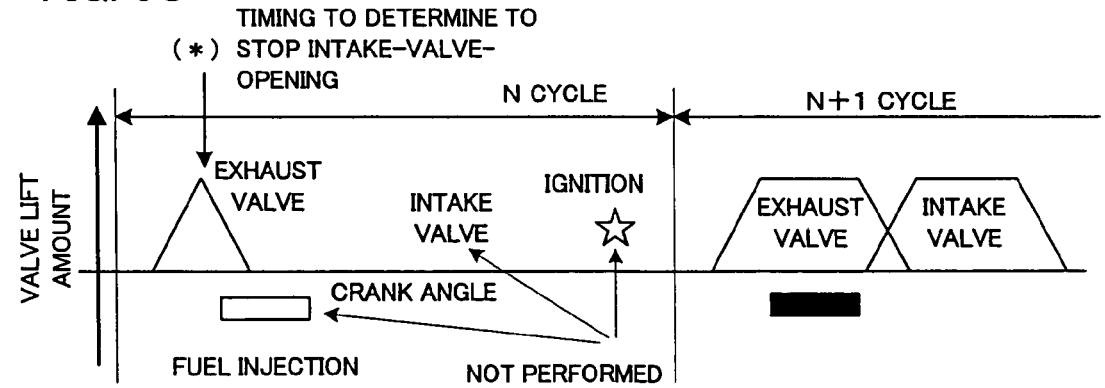

In FIG. 9A, FIG. 9B, and FIG. 9C, the vertical axis shows the valve lift amount of the exhaust valve 211 and the intake valve 201, which are driven by electromagnetism, and the horizontal axis shows the crank angle.

With reference to FIG. 9A, the operation of the internal combustion engine 100 in the N cycle in the normal case will be specifically explained. In the N cycle, at first, fuel is injected from the fuel injection valve 145 or the exhaust valve 211 driven by electromagnetism is opened. Then, the intake valve 201 driven by electromagnetism is opened. After the passage of a time length of valve-overlapping in which the exhaust valve 211 and the intake valve 201, which are driven by electromagnetism, are both opened, the exhaust valve 211 driven by electromagnetism is closed. Then, after the intake valve 201 driven by electromagnetism is closed, the air/fuel mixture is ignited by the ignition plug 165 and burned.

With reference to FIG. 9B, the fail-safe processing in the following case will be explained: in the case where (i) it is judged that the actual product "A1" of the opening area and time of the exhaust valve 211 driven by electromagnetism is less than the target product "A2" of the opening area and time, under the control of the ECU 10, when the failure in the seating for valve-opening of the exhaust valve 211 driven by electromagnetism is detected in the N cycle, (ii) it is determined to stop the valve-opening of the intake valve 201 driven by electromagnetism in the N cycle, and (iii) fuel is already injected upon the determination, in one example of the third fail-safe processing associated with the embodiment.

As shown in FIG. 9B, in the third fail-safe processing associated with the embodiment, when the failure in the seating for valve-opening of the exhaust valve 211 driven by electromagnetism is detected, it is judged that the actual product "A1" of the opening area and time of the exhaust valve 211 driven by electromagnetism is less than the target product "A2" of the opening area and time, under the control of the ECU 10, and it is determined to stop the valve-opening of the intake valve 201 driven by electromagnetism in the N cycle. If fuel is already injected upon the determination by the ECU 10, the valve-opening of the intake valve 201 driven by electromagnetism is stopped, under the control of the ECU 10, with fuel for burning one time drifting in the intake port 140, and the intake stroke is omitted only once. Moreover, the ignition in the N cycle is stopped, and the fuel injection in an N+1 cycle is stopped.

As described above, the exhaust valve 211 driven by electromagnetism is opened in the same manner as in the normal case, in the next N+1 cycle, without having an influence of the failure in the seating for valve-opening on the next N+1 cycle, by which it is possible to omit the ineffective ignition and the excessive fuel injection and it is possible to realize the proper ignition and combustion.

Next, as shown in FIG. 9C, the fail-safe processing in the following case will be explained: in the case where (i) it is judged that the actual product "A1" of the opening area and time of the exhaust valve 211 driven by electromagnetism is less than the target product "A2" of the opening area and time, under the control of the ECU 10, when the failure in the seating for valve-opening of the exhaust valve 211 driven by electromagnetism is detected in the N cycle, (ii) it is determined to stop the valve-opening of the intake valve 201 driven by electromagnetism in the N cycle, and (iii) fuel is not injected yet upon the determination, in one example of the third fail-safe processing associated with the embodiment.

As shown in FIG. 9C, in the third fail-safe processing associated with the embodiment, when the failure in the seating for valve-opening of the exhaust valve 211 driven by electromagnetism is detected, it is judged that the actual product "A1" of the opening area and time of the exhaust valve 211 driven by electromagnetism is less than the target product "A2" of the opening area and time, under the control of the ECU 10, and it is determined to stop the valve-opening of the intake valve 201 driven by electromagnetism in the N cycle. If fuel is not injected yet in the intake port 140 upon the determination by the ECU 10, the fuel injection in the N cycle is stopped in advance under the control of the ECU 10. Moreover, the valve-opening of the intake valve 201 driven by electromagnetism in the N cycle is stopped, and the ignition in the N cycle is stopped.

As described above, the exhaust valve 211 driven by electromagnetism is opened and fuel is injected in the same manner as in the normal case, in the next N+1 cycle, without having an influence of the failure in the seating for valve-opening on the next N+1 cycle, by which it is possible to omit the ineffective ignition and the excessive fuel injection and it is possible to realize the proper ignition and combustion.

Next, with reference to FIG. 10, the third fail-safe processing according to the actual product of the opening area and time of the exhaust valve 211 driven by electromagnetism, which is controlled by the ECU 10 in the embodiment, will be explained. FIG. 10 shows a third fail-safe processing routine associated with the embodiment. The third fail-safe processing routine is performed mainly by the ECU 10, and the structure of the ECU 10 or the like is the same as that in the first fail-safe processing routine. Incidentally, in FIG. 10, the same steps as those in FIG. 8, which shows the second fail-safe processing routine, carry the same reference numerals, and the explanations for them are omitted.

Figure 10:
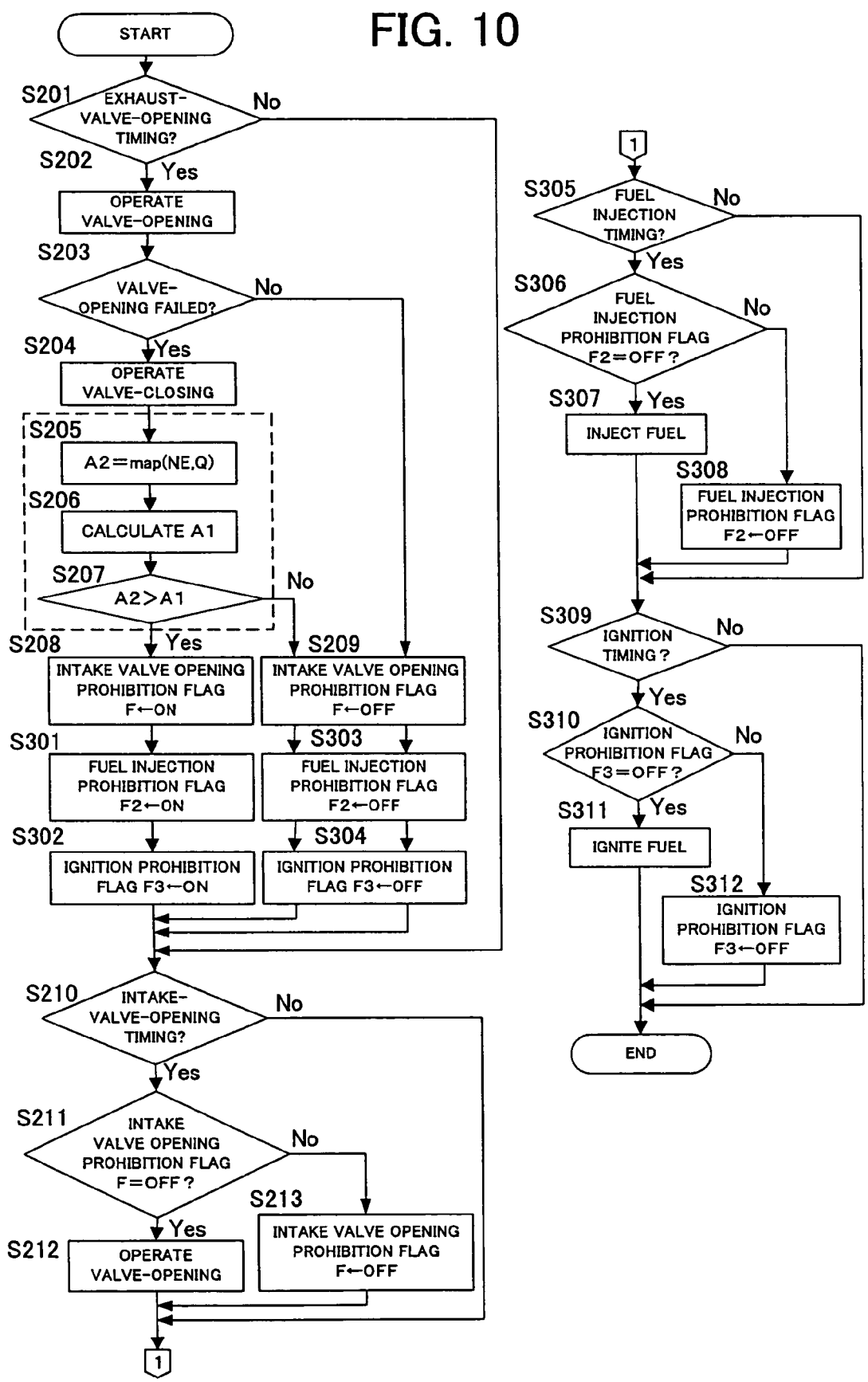
FIG. 10 is a flowchart showing a third fail-safe processing routine associated with the embodiment.

In FIG. 10, the step S201 to the step S208 are the same as those in FIG. 8, which shows the second fail-safe processing routine.

Then, "On" is substituted into a fuel injection prohibition flag "F2" (step S301), and "On" is substituted into an ignition prohibition flag "F3" (step S302).

On the other hand, if the actual product "A1" of the opening area and time is greater than or equal to the target product "A2" of the opening area and time as a result of the judgment in the step S207 (step S207: No), and if it is judged that the exhaust valve 211 driven by electromagnetism succeeds in the valve-opening as a result of the judgment in the step S203 (the step S203: No), "Off" is substituted into the valve-opening prohibition flag "F" for the intake valve (the step S209).

Then, "Off" is substituted into the fuel injection prohibition flag "F2" (step S303), and "Off" is substituted into the ignition prohibition flag "F3" (step S304).

The step S210 to the step S213 are the same as those in FIG. 8, which shows the second fail-safe processing routine.

Then, it is judged whether or not it is a fuel injection timing (step S305). If it is judged to be the fuel injection timing (the step S305: Yes), it is further judged whether or not the fuel injection prohibition flag "F2" is "Off" (step S306). If it is judged that the fuel injection prohibition flag "F2" is "Off" (the step S306: Yes), fuel is injected from the fuel injection valve 145 (step S307).

On the other hand, if it is judged that the fuel injection prohibition flag "F2" is "On" as a result of the judgment in the step S306 (the step S306: No), fuel is not injected and "Off" is substituted into the fuel injection prohibition flag "F2" (step S308).

On the other hand, if it is judged not to be the fuel injection timing as a result of the judgment in the step S305 (the step S305: No), the judgment of whether or not the fuel injection prohibition flag "F2" is "Off" in the step S306, the fuel injection in the step S307, and the substitution of "Off" into the fuel injection prohibition flag "F2" in the step S308 are omitted.

Then, it is judged whether or not it is an ignition timing (step S309). If it is judged to be the ignition timing (the step S309: Yes), it is further judged whether or not the ignition prohibition flag "F3" is "Off" (step S310). If it is judged that the ignition prohibition flag "F3" is "Off" (the step S310: Yes), the air/fuel mixture is ignited (step S311).

On the other hand, if it is judged that the ignition prohibition flag "F3" is "On" as a result of the judgment in the step S310 (the step S310: No), the air/fuel mixture is not ignited and "Off" is substituted into the ignition prohibition flag "F3" (step S312).

On the other hand, if it is judged not to be the ignition timing as a result of the judgment in the step S309 (the step S309: No), the judgment of whether or not the ignition prohibition flag "F3" is "Off" in the step S310, the ignition of the air/fuel mixture in the step S311, and the substitution of "Off" into the ignition prohibition flag "F3" in the step S312 are omitted.

(Fourth Fail-safe Processing)

The fail-safe processing associated with the embodiment will be explained below with reference to FIG. 11 and FIG. 12.

In the fourth fail-safe processing associated with the present invention, such fail-safe processing that the above-described third fail-safe processing is applied to the case where the intake valve 201 driven by electromagnetism fails in the seating for valve-opening will be explained. Specifically, if the failure in the seating for valve-opening of the intake valve 201 driven by electromagnetism is detected, the intake valve 201 driven by electromagnetism is closed and maintained in the fully closed position, under the control of the ECU 10. If it is judged that the actual product "A1" of the opening area and time of the intake valve 201 driven by electromagnetism in the cylinder in the N cycle is less than the target product "A2" of the opening area and time, the ignition in the N cycle immediately after that, the fuel injection in the next N+1 cycle, and the valve-opening of the exhaust valve 211 driven by electromagnetism in the next N+1 cycle are stopped only once. After the valve-opening of the intake valve 201 driven by electromagnetism in the next N+1 cycle, the electromagnetically driven valves are controlled in the same manner as in the normal case.

Firstly, with reference to FIG. 11A and FIG. 11B, the operations of the exhaust valve 211 and the intake valve 201, which are driven by electromagnetism, the fuel injection valve 145, and the ignition plug 165, in the normal case of the intake valve 201 driven by electromagnetism and in the case of failing to seat for valve-opening of the intake valve 201 driven by electromagnetism in the fourth fail-safe processing associated with the embodiment will be explained.

Figure 11A:
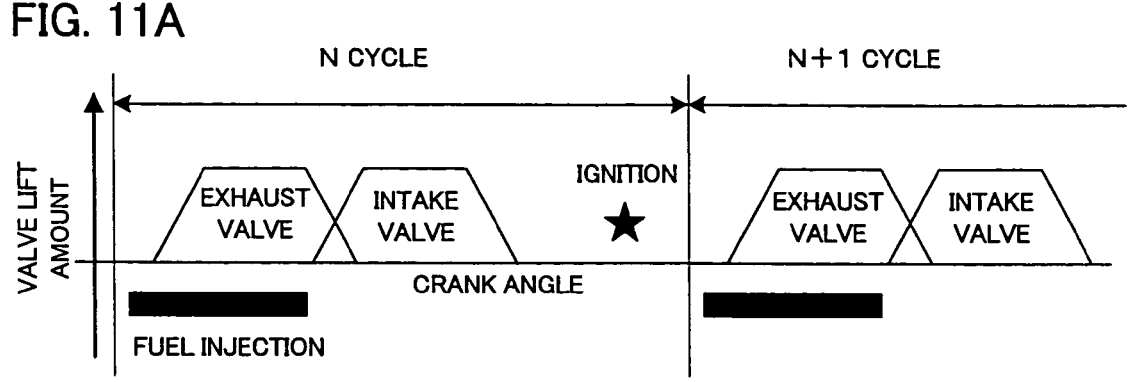
FIG. 11A and FIG. 11B are characteristic diagrams showing the valve lift amount and the operating angle with respect to the crank angle, in the normal case or the like of the electromagnetically driven valves associated with the embodiment.

FIG. 11A shows a change in the valve lift amount with respect to crank angle, in the normal case of the exhaust valve 211 and the intake valve 201, which are driven by electromagnetism. FIG. 11B shows a change in the valve lift amount with respect to crank angle, in the case where the intake valve 201 driven by electromagnetism fails in the seating for valve-opening in the fourth fail-safe processing associated with the embodiment.

Figure 11B:
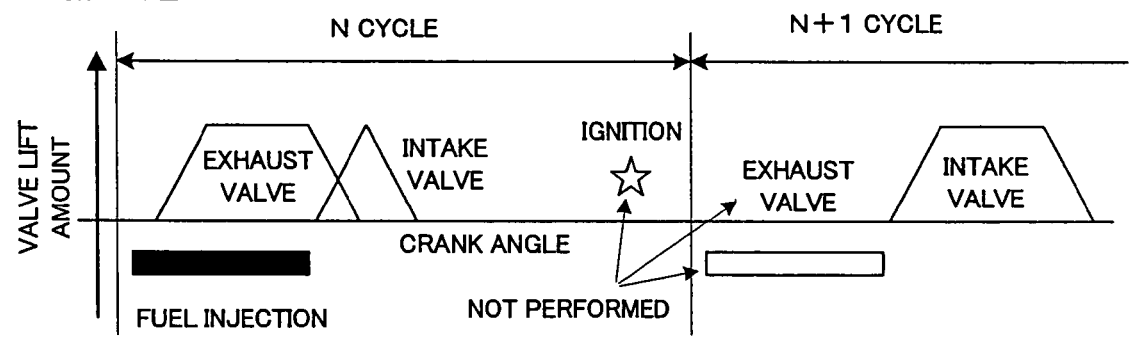

In FIG. 11A and FIG. 11B, the vertical axis shows the valve lift amount of the exhaust valve 211 and the intake valve 201, which are driven by electromagnetism, and the horizontal axis shows the crank angle.

The explanation for the operation of the internal combustion engine 100 in the N cycle in the normal case is the same as that in FIG. 9A, so that it is omitted.

With reference to FIG. 11B, the fail-safe processing in the following case will be explained: in the case where it is judged that the actual product "A1" of the opening area and time of the intake valve 201 driven by electromagnetism is less than the target product "A2" of the opening area and time, under the control of the ECU 10, when the failure in the seating for valve-opening of the intake valve 201 driven by electromagnetism in the N cycle is detected in the fourth fail-safe processing associated with the embodiment.

As shown in FIG. 11B, it is assumed, in the fourth fail-safe processing associated with the embodiment, that it is judged that the actual product "A1" of the opening area and time of the intake valve 201 driven by electromagnetism is less than the target product "A2" of the opening area and time, under the control of the ECU 10, when the failure in the seating for valve-opening of the intake valve 201 driven by electromagnetism is detected after the exhaust valve 211 driven by electromagnetism is opened and fuel is injected to the intake port 140. In this case, fuel and new air are taken in the combustion chamber only partially, and the most part of them remain on the intake port 140 side. This causes the failure to ignite and burn the air/fuel mixture highly possibly, so that the ignition in the N cycle is stopped under the control of the ECU 10. Moreover, if one portion of fuel and new air remained in the combustion chamber 160 are exhausted, they react with a catalyst and possibly melt the catalyst, so that the valve-opening of the exhaust valve 211 driven by electromagnetism in the N+1 cycle is also stopped.

As described above, the intake valve 201 driven by electromagnetism is opened in the same manner as in the normal case, in the next N+1 cycle, without having an influence of the failure in the seating for valve-opening on the next N+1 cycle, and the air/fuel mixture at a proper air/fuel ratio is inhaled, by which it is possible to realize the proper ignition and combustion. Specifically, the air/fuel mixture at a proper air/fuel ratio is inhaled by inhaling again the mixture of the most part of fuel that is injected to the intake port 140 in the N cycle but not inhaled into the cylinder and the fuel that is once inhaled into the cylinder in the N cycle, in the intake stroke in the N+1 cycle, by which it is possible to realize the proper ignition and combustion.

Next, with reference to FIG. 12, the fourth fail-safe processing according to the actual product of the opening area and time of the intake valve 201 driven by electromagnetism, which is controlled by the ECU 10 in the embodiment, will be explained. FIG. 12 shows a fourth fail-safe processing routine associated with the embodiment. The fourth fail-safe processing routine is performed mainly by the ECU 10, and the structure of the ECU 10 or the like is the same as that in the first fail-safe processing routine. Incidentally, in FIG. 12, the same steps as those in FIG. 8, which shows the second fail-safe processing routine, and as those in FIG. 10, which shows the third fail-safe processing routine, carry the same reference numerals, and the explanations for them are omitted.

Figure 12:
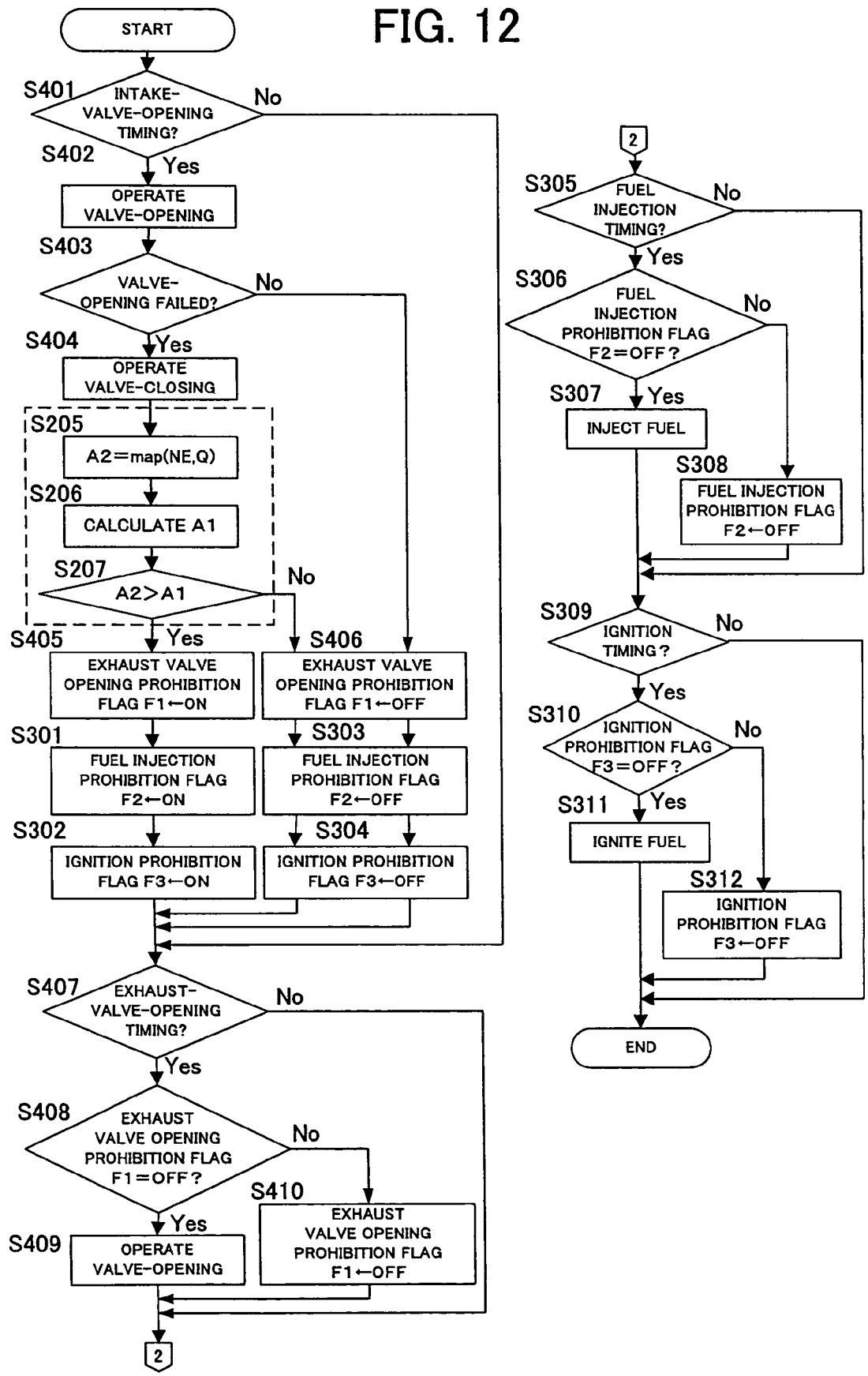
FIG. 12 is a flowchart showing a fourth fail-safe processing routine associated with the embodiment.

In FIG. 12, at first, it is judged whether or not it is the valve-opening timing of the intake valve 201 driven by electromagnetism (step S401). Such judgment is the same as in the first fail-safe processing. If it is judged to be the valve-opening timing of the intake valve 201 driven by electromagnetism (the step S401: Yes), the valve-opening of the intake valve 201 driven by electromagnetism is operated (step S402).

Then, it is judged whether or not the intake valve 201 driven by electromagnetism fails in the valve-opening (step S403). Such judgment is the same as in the first fail-safe processing. If it is judged that the intake valve 201 driven by electromagnetism fails in the valve-opening (the step S403: Yes), the valve-closing of the intake valve 201 driven by electromagnetism is operated (step S404).

The step S205 to the step S207 are the same as those in FIG. 8, which shows the second fail-safe processing routine.

If the actual product "A1" of the opening area and time is less than the target product "A2" of the opening area and time (step S207: Yes), "On" is substituted into a valve-opening prohibition flag "F1" for the exhaust valve (step S405).

The step S301 and the step S302 are the same as those in FIG. 10, which shows the third fail-safe processing routine.

On the other hand, if the actual product "A1" of the opening area and time is greater than or equal to the target product "A2" of the opening area and time as a result of the comparison in the step S207 (step S207: No), and if it is judged that the intake valve 201 driven by electromagnetism succeeds in the valve-opening as a result of the judgment in the step S403 (the step S403: No), "Off" is substituted into the valve-opening prohibition flag "F1" for the exhaust valve (step S406).

The step S303 and the step S304 are the same as those in FIG. 10, which shows the third fail-safe processing routine.

Then, it is judged whether or not it is the valve-opening timing of the exhaust valve 211 driven by electromagnetism (step S407). If it is judged to be the valve-opening timing of the exhaust valve 211 driven by electromagnetism (the step S407: Yes), it is further judged whether or not the valve-opening prohibition flag "F1" for the exhaust valve is "Off" (step S408). If it is judged that the valve-opening prohibition flag "F1" for the exhaust valve is "Off" (the step S408: Yes), the valve-opening of the exhaust valve 211 driven by electromagnetism is operated (step S409).

On the other hand, if it is judged that the valve-opening prohibition flag "F1" for the exhaust valve is "On" as a result of the judgment in the step S408 (the step S408: No), the valve-opening of the intake valve 201 driven by electromagnetism is not operated, and "Off" is substituted into the valve-opening prohibition flag "F1" for the exhaust valve (step S410).

On the other hand, if it is judged not to be the valve-opening timing of the exhaust valve 211 driven by electromagnetism as a result of the judgment in the step S407 (the step S407: No), the judgment of whether or not the valve-opening prohibition flag "F1" for the exhaust valve is "Off" in the step S408, the valve-opening of the exhaust valve 211 driven by electromagnetism in the step S409, and the substitution of "Off" into the valve-opening prohibition flag "F1" for the exhaust valve in the step S410 are omitted.

The step S305 to the step S312 are the same as those in FIG. 10, which shows the third fail-safe processing routine.

Incidentally, in the above-described embodiment, a port injection type internal combustion engine is explained as one example of the internal combustion engine. The present invention, however, is also applied to a cylinder injection type (or direct injection type) internal combustion engine.

Incidentally, in the above-described embodiment, the control apparatus for controlling an electromagnetically driven valve is explained as one example of the mechanism for opening or closing an intake valve and an exhaust valve. The present invention, however, is also applied to a variable valve mechanism.

Figure 13:
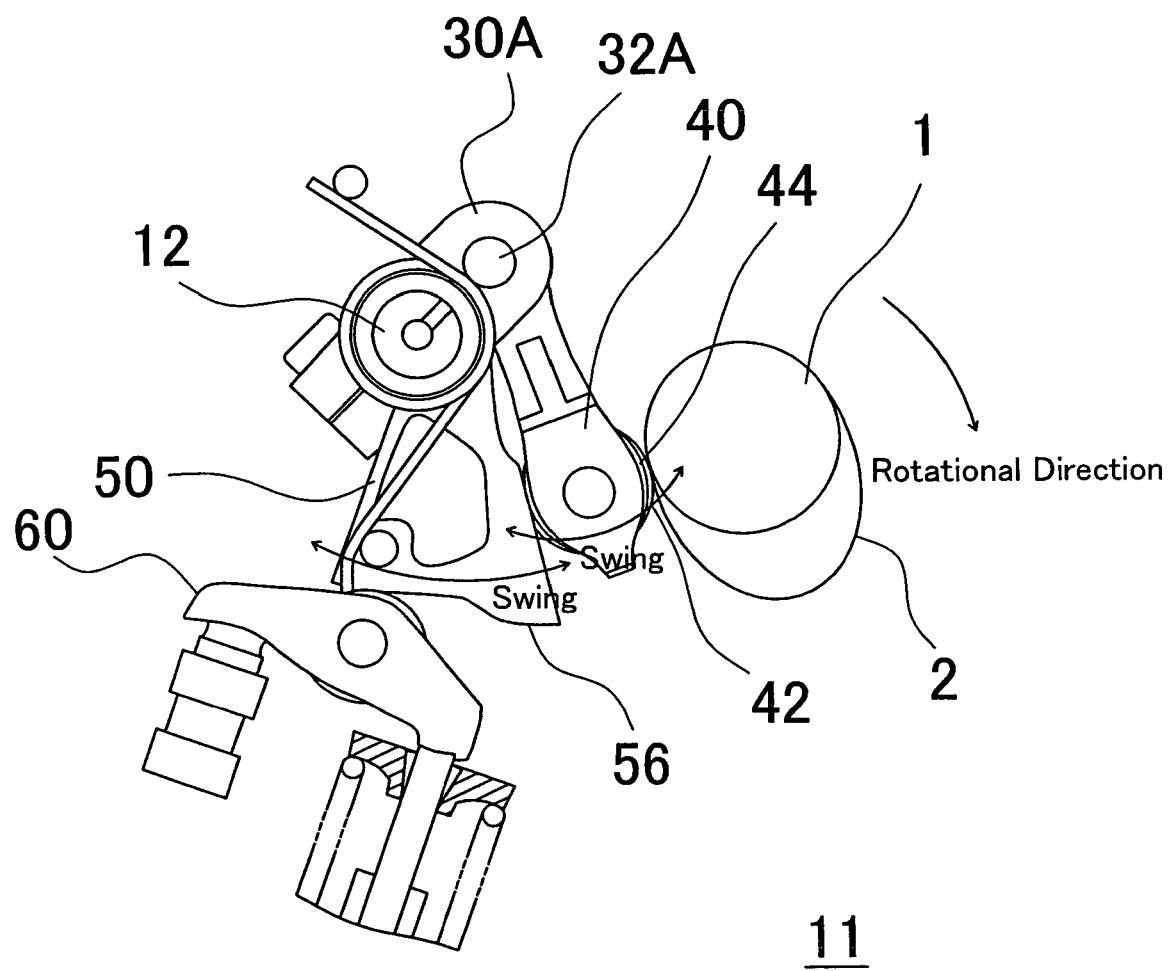
FIG. 13 is a schematic diagram showing the structure and operation of one specific example of a variable valve mechanism of the present invention.

One specific example of the variable valve mechanism will be explained hereinafter with reference to FIG. 13. FIG. 13 shows the structure and operation of one specific example of the variable valve mechanism of the present invention.

As shown in FIG. 13, the outline operation of one specific example of the variable valve mechanism 11 of the present invention is as follows. The rotational motion of a cam shaft 1 is transmitted to a roller follower 40 through a valve cam 2. The swing motion of the roller follower 40 is transmitted to a roller arm 60 through a swing cam 50, to thereby open or close not-illustrated intake and exhaust valves.

Next, the detailed structure and detailed operation of one specific example of the variable valve mechanism 11 of the present invention will be explained.

A control shaft 12 is mounted in parallel to the cam shaft 1. A control arm 30A is fixed and mounted on the control shaft 12. Incidentally, the rotation angle of the control shaft 12 can be controlled by for example a not-illustrated motor.

One end portion of the roller follower 40 is swingably mounted on the control arm 30A. More specifically, the one end portion of the roller follower 40 is swingably mounted on the control arm 30A with an eccentric position 32A as a fulcrum, wherein the eccentric position 32A is different from the control shaft 12 of the control arm 30A. Incidentally, the eccentric position 32A of the control arm 30A can be changed according to the rotation angle of the control shaft 12.

The roller follower 40 is provided with a first roller 42 and a second roller 44, coaxially, each of which can rotate independently. The first roller 42 abuts on a valve cam 2 mounted on the cam shaft 1. The second roller 44 abuts on the swing cam 50, on the opposite side to where the first roller 42 abuts on the valve cam 2, wherein the roller follower 40 is between the two contact positions.

The swing cam 50 is swingably mounted, with the control shaft 12 as a fulcrum. A rocker arm 60 abuts on a bottom surface 56 of the swing cam 50.

Since the variable valve mechanism 11 is constructed in the above manner, the rotational motion of the cam shaft 1 can be transmitted to the roller follower 40 through the valve cam 2. The displacement of the position of the fulcrum for the roller follower 40 swinging (i.e., the eccentric position 32A) changes a distance between the control shaft 12 and the contact position of the second roller 44 with the swing cam 50. By this, it is possible to change a valve lift amount. More specifically, if the distance between the control shaft 12 and the contact position of the second roller 44 with the swing cam 50 becomes longer, the range of the swing angle of the swing cam 50 becomes smaller, with respect to the predetermined swing angle of the roller follower 40. On the other hand, if the distance between the control shaft 12 and the contact position of the second roller 44 with the swing cam 50 becomes smaller, the range of the swing angle of the swing cam 50 becomes larger, with respect to the predetermined swing angle of the roller follower 40.

In addition, a valve timing for opening and closing can be changed by changing the circumferential position of the valve cam 2 which abuts on the first roller 42, with respect to the predetermined rotation angle of the cam shaft 1.

As a result, it is possible to change the valve timing for opening and closing in addition to the operating angle of the valve by controlling the rotation angle of the control shaft 12 by for example the motor.

As described above, if the above-described one specific example of the variable valve mechanism 11 is adopted in the embodiment, upon the occurrence of failure of the valve opening operation, the opening or closing operation of the intake valve and the exhaust valve may be performed by controlling the rotational angle of the control shaft 12.

Figure 14:
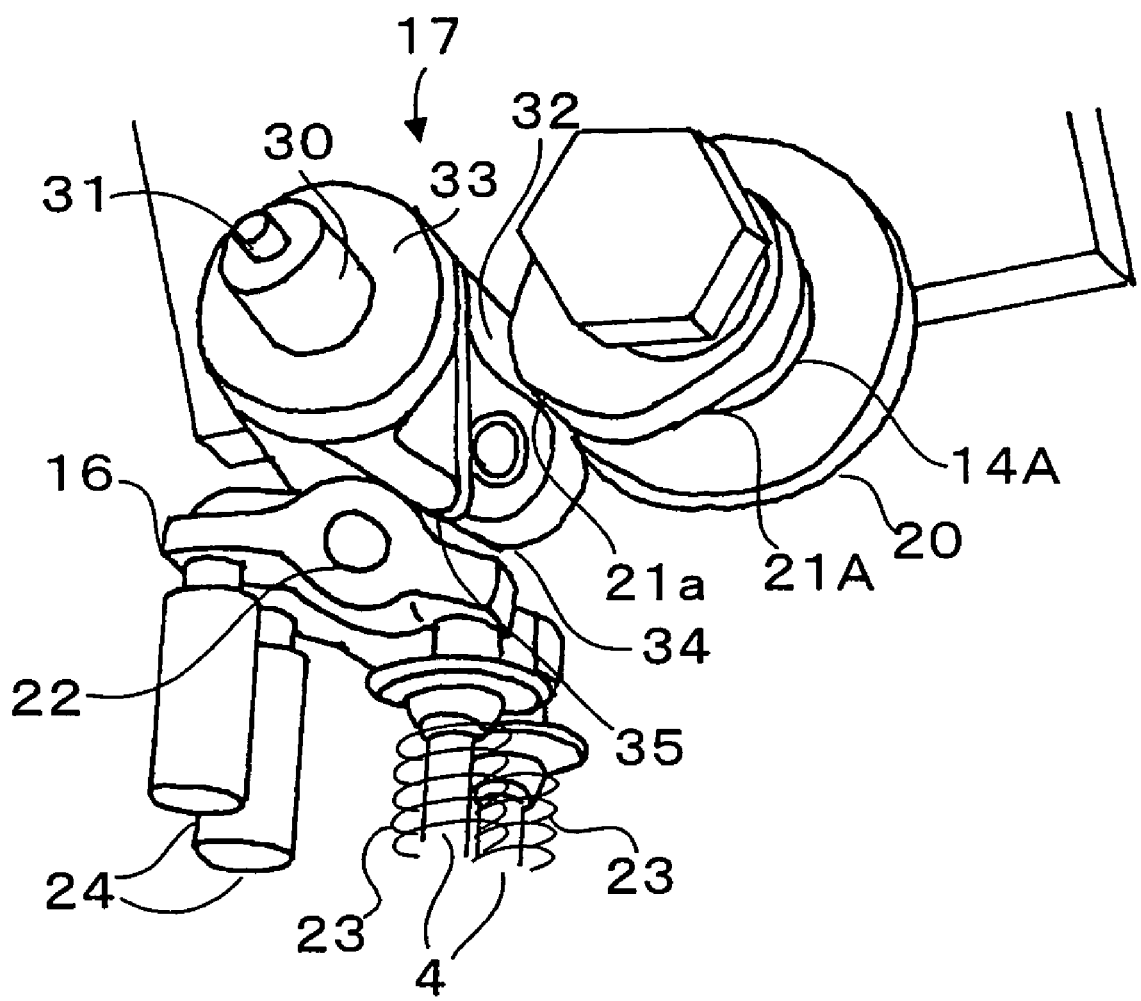
FIG. 14 is a schematic diagram showing the structure and operation of a valve-characteristics adjusting mechanism of another specific example of a variable valve mechanism of the present invention as viewed from further another direction.
Figure 15:
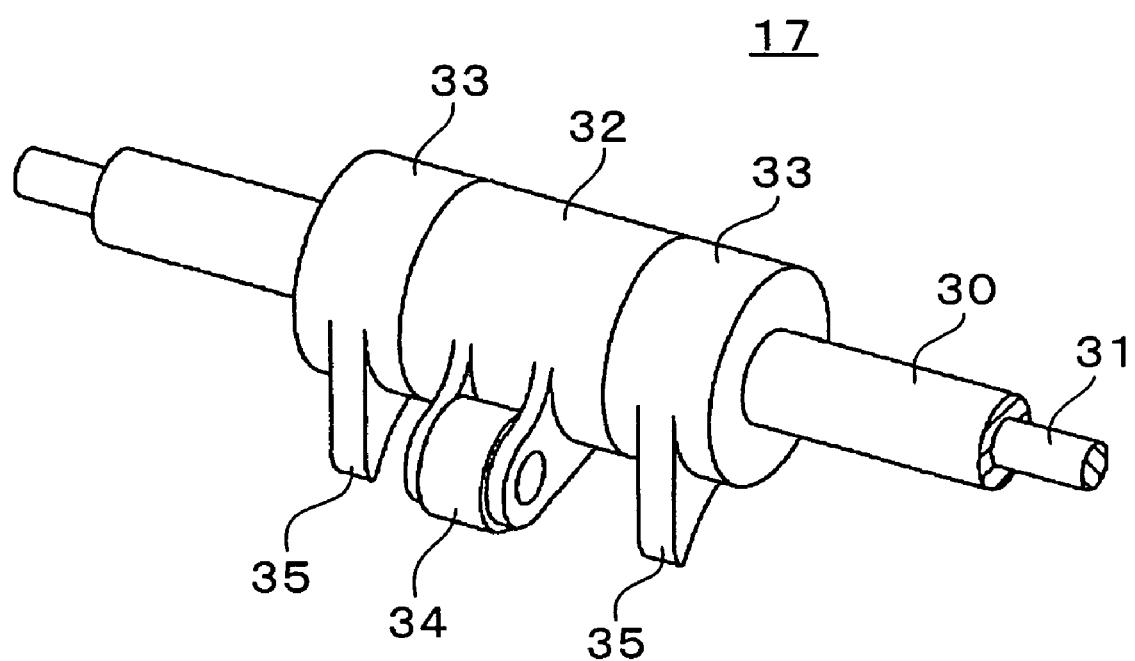
FIG. 15 is a schematic diagram showing the structure and operation of a valve-characteristics adjusting mechanism of another specific example of a variable valve mechanism of the present invention.
Figure 16:
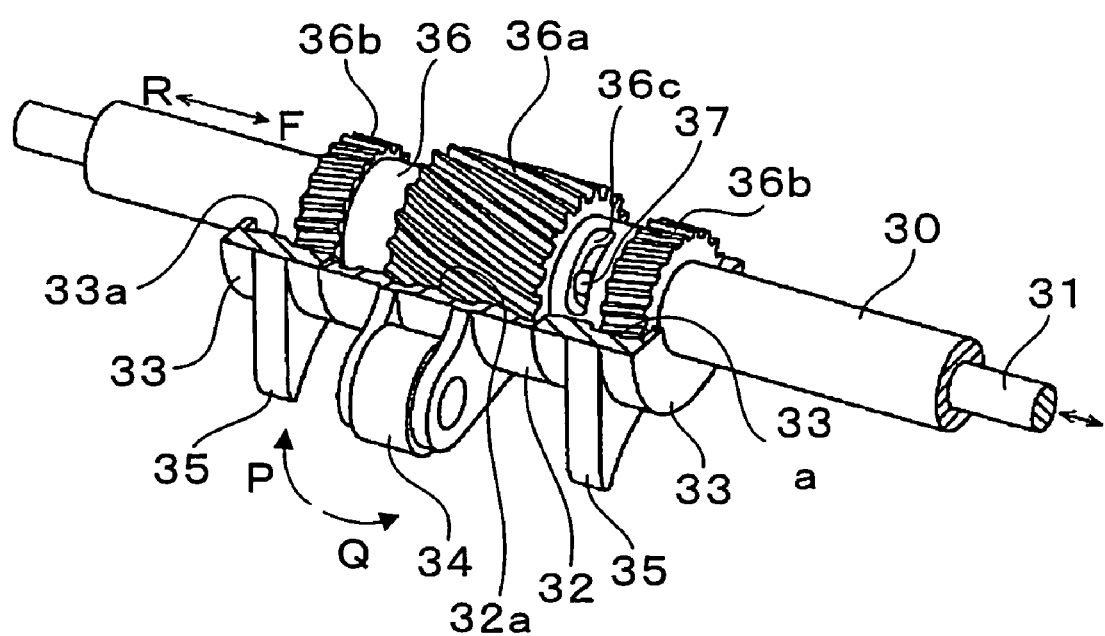
FIG. 16 is a partially cut-away schematic diagram showing the structure and operation of a valve-characteristics adjusting mechanism of another specific example of a variable valve mechanism of the present invention.

Another specific example of the variable valve mechanism will be explained hereinafter with reference to FIG. 14 to FIG. 16. FIG. 14 shows the structure and operation of a valve-characteristics adjusting mechanism of another specific example of a variable valve mechanism of the present invention as viewed from further another direction. FIG. 15 shows the structure and operation of a valve-characteristics adjusting mechanism of another specific example of a variable valve mechanism of the present invention. FIG. 16 shows the structure and operation of a valve-characteristics adjusting mechanism of another specific example of a variable valve mechanism of the present invention.

As shown in FIG. 14, the valve-characteristics adjusting mechanism 17 functions as an intermediacy device which transmits the rotational motion of the cam 21A as swinging motion to the rocker arm 16, and also functions as a lift amount and operating angle changing device which changes the lift amount and the operating angle of the intake valve 4 by changing a correlation between the rotational motion of the cam 21A and the swinging motion of the rocker arm 16.

As shown in FIG. 15, specifically the valve-characteristics adjusting mechanism 17 includes a supporting shaft 30, an operation shaft 31 which passes through a center of the supporting shaft 30, a first ring 32 disposed on the supporting shaft 30, and two second rings 33 disposed on opposite sides of the first ring 32. The supporting shaft 30 is fixed to a cylinder head or the like of the internal combustion engine 100. The operation shaft 31 is reciprocated in an axial direction (in directions R and F in FIG. 16) of the supporting shaft 30 by an actuator (not shown). The first ring 32 and second rings 33 are supported such that they can swing around the supporting shaft 30 and slide in the axial direction thereof. A roller follower 34 is rotatably mounted on an outer periphery of the first ring 32, and noses 35 are respectively formed on outer peripheries of the second rings 33.

As shown in FIG. 16, the supporting shaft 30 is provided at its outer periphery with a slider 36. The slider 36 includes an elongated hole 36c extending in its circumferential direction. If a pin 37 mounted to the operation shaft 31 engages in the elongated hole 36c, the slider 36 can slide in the axial direction integrally with the operation shaft 31 with respect to the supporting shaft 30. The supporting shaft 30 is formed with an elongated hole (not shown) in the axial direction. The elongated holes permit the pin 37 to move in the axial direction. The slider 36 is integrally provided, at its outer periphery, with a first helical spline 36a and second helical splines 36b and 36b disposed such as to sandwich the first helical spline 36a. A twisting direction of the second helical spline 36b is opposite from that of the first helical spline 36a. The first ring 32 is formed, at its inner periphery, with a helical spline 32a which meshes with the first helical spline 36a. The second ring 33 is formed, at its inner periphery, with a helical spline 33a which meshes with the second helical spline 36b.

As shown in FIG. 14, more specifically the valve-characteristics adjusting mechanism 17 is added to the internal combustion engine 100 in such a manner that the roller follower 34 thereof is opposed to the cam 21A while the noses 35 are opposed to ends of the rocker arms 16 corresponding to the respective intake valves 4. If the roller follower 34 comes into contact with the nose section 21a and is pushed down as the cam 21A rotates, the first ring 32 supporting the roller follower 34 rotates on the supporting shaft 30, its rotational motion is transmitted to the second ring 33 through the slider 36, and the second ring 33 rotates in the same direction as that of the first ring 32. By the rotation of the second ring 32, the nose 35 pushes down one end of the rocker arm 16, the intake valve 4 is downwardly displaced against the valve spring 23 to open the intake port. If the nose section 21a gets over the roller follower 34, the intake valve 4 is pushed upward by a force of the valve spring 23 to close the intake port. In this manner, the rotational motion of the cam shaft 14A is converted into the opening and closing motion of the intake valve 4.

In the valve-characteristics adjusting mechanism 17, if the operation shaft 31 is displaced in the axial direction and the slider 36 is allowed to slide with respect to the supporting shaft 30 as shown in FIG. 16 with the arrows R and F, the first ring 32 and the second rings 33 are rotated in the opposite direction in the circumferential direction. When the slider 36 is moved in the direction of the arrow F, the first ring 32 is rotated in the direction of arrow P and the second rings 33 are rotated in the direction of arrow Q, and a distance between the roller follower 34 and the nose 35 in the circumferential direction is increased. On the other hand, if the slider 36 is moved in the direction of arrow R, the first ring 32 is rotated in the direction of arrow Q and the second rings 33 are rotated in the direction of arrow P, and the distance between the roller follower 34 and the nose 35 in the circumferential direction is reduced. As the distance between the roller follower 34 and the nose 35 is increased, the pushing-down amount of the rocker arm 16 by the nose 35 is increased. With this, the lift amount and the operating angle of the intake valve 4 are also increased. Therefore, as the operation shaft 31 is operated in the direction of arrow F shown in FIG. 16, the lift amount and the operating angle of the intake valve 4 are increased.

According to the valve-characteristics adjusting mechanism 17 configured as described above, if the cam shaft 14A is continuously driven in one direction at half the speed (called basic speed hereinafter) of rotation speed of the crank shaft of the internal combustion engine 100, the intake valve 4 can be opened and closed in synchronization with rotation of the crank shaft like a conventional mechanical valve-driving apparatus that drives the valve by the power from the crank shaft. Further, the lift amount and the operating angle of the intake valve 4 can be changed by the valve-characteristics adjusting mechanism 17.

Further, according to the valve-characteristics adjusting mechanism 17, by changing the rotation speed of the cam shaft 14A by the motor (not shown) from the basic speed, it is possible to change the correlation between the phase of the crank shaft and the phase of the cam shaft 14A, and to variously change the operation characteristics of the intake valve 4.

As described above, if the above-described another specific example of the variable valve mechanism is adopted in the embodiment, upon the occurrence of failure of the valve opening operation, the opening or closing operation of the intake valve and the exhaust valve may be performed by the controlling the rotation of the cam shaft 14A rotated by the motor under the control of e.g., the ECU (Engine Control Unit).

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Application No. 2003-172562 filed on Jun. 17, 2003 including the specification, claims, drawings and summary is incorporated herein by reference in its entirety.

What is claimed is:

1. A control apparatus for controlling an electromagnetically driven valve, which includes at least one of an electromagnetically driven exhaust valve for opening or closing an exhaust valve and an electromagnetically driven intake valve for opening or closing an intake valve in an internal combustion engine, said control apparatus comprising:

a first judging device for judging whether or not the electromagnetically driven valve fails in seating for valve-opening; and a fail-safe device for controlling the electromagnetically driven valve to perform an operation of valve-opening again in a same stroke of the operation of valve-opening if it is judged by said first judging device that the electromagnetically driven valve fails in the seating for valve-opening.

2. The control apparatus for controlling an electromagnetically driven valve according to claim 1, wherein said fail-safe device controls the electromagnetically driven valve to perform the operation of valve-opening again in the same stroke after seating for valve-closing if it is judged that the electromagnetically driven valve fails in the seating for valve-opening.

3. The control apparatus for controlling an electromagnetically driven valve according to claim 1, wherein said fail-safe device controls the electromagnetically driven valve to seat for valve-closing at a same valve-closing timing as in a normal case, after seating again for valve-opening in the same stroke.

4. The control apparatus for controlling an electromagnetically driven valve according to claim 1, further comprising: a second judging device for judging whether or not there is time to perform the operation of valve-opening the electromagnetically driven valve again in the same stroke, said fail-safe device controlling the electromagnetically driven valve to perform the operation of valve-opening again in the same stroke only if it is judged that there is the time.

5. The control apparatus for controlling an electromagnetically driven valve according to claim 4, further comprising: an engine-revolutions detecting device for detecting the number of engine revolutions of the internal combustion engine, said second judging device judging whether or not there is the time on the basis of the number of engine revolutions detected by said engine-revolutions detecting device.

6. The control apparatus for controlling an electromagnetically driven valve according to claim 4, wherein said fail-safe device controls at least one of the electromagnetically driven valve, a fuel injection valve, and an ignition plug to prohibit at least one of the operation of valve-opening of the electromagnetically driven valve, and fuel injection and ignition with respect to the internal combustion engine, until the same stroke in a next cycle, if it is judged that there is no time to perform the operation of valve-opening again in the same stroke.

7. The control apparatus for controlling an electromagnetically driven valve according to claim 1, further comprising:

a measuring device for measuring an actual product of an opening area and time of the electromagnetically driven valve if it is judged that the electromagnetically driven valve fails in the seating for valve-opening; and another judging device for judging whether or not the electromagnetically driven valve is to be prohibited from performing the operation of valve-opening again in the same stroke or in the same cycle on the basis of the measured actual product of the opening area and time, said fail-safe device controlling the electromagnetically driven valve to prohibit it from opening in the same stroke or in the same cycle and to prohibit it from opening until the same stroke in a next cycle, only if it is judged that the electromagnetically driven valve is to be prohibited.

8. The control apparatus for controlling an electromagnetically driven valve according to claim 7, further comprising: a calculating device for calculating a target product of the opening area and time on the basis of required torque of the internal combustion engine, said another judging device judging that the electromagnetically driven intake valve is to be prohibited from performing the operation of valve-opening in the same cycle, in such a condition that the measured actual product of the opening area and time of the electromagnetically driven exhaust valve is less than the calculated target product of the opening area and time.

9. The control apparatus for controlling an electromagnetically driven valve according to claim 7, wherein said fail-safe device controls at least one of the electromagnetically driven valve, a fuel injection valve, and an ignition plug to prohibit at least one of the operation of valve-opening of the electromagnetically driven valve, and fuel injection and ignition with respect to the internal combustion engine, until the same stroke in a next cycle, if it is judged that the electromagnetically driven valve is not to be prohibited.

10. The control apparatus for controlling an electromagnetically driven valve according to claim 1, wherein said fail-safe device further controls at least one of the electromagnetically driven valve, a fuel injection valve, and an ignition plug to prohibit at least one of an operation of valve-opening of the electromagnetically driven valve, and fuel injection and ignition with respect to the internal combustion engine, until a same stroke in a next cycle of the operation of valve-opening, if it is judged that the electromagnetically driven valve fails in the seating for valve-opening.

11. The control apparatus for controlling an electromagnetically driven valve according to claim 10, wherein said fail-safe device further controls the fuel injection valve and the ignition plug to allow the fuel injection and prohibit the ignition in the same cycle, and to prohibit the fuel injection and perform the ignition in the next cycle, if the fuel injection is started in the same stroke in which the fail is occurred in the same cycle.

12. A variable valve mechanism for controlling a variable valve, which includes at least one of a variable exhaust valve for opening or closing an exhaust valve and a variable intake valve for opening or closing an intake valve in an internal combustion engine, said variable valve mechanism comprising:
- a first judging device for judging whether or not the variable valve fails in seating for valve-opening; and
- a fail-safe device for controlling the variable valve to perform an operation of valve-opening again in a same stroke of the operation of valve-opening if it is judged by said first judging device that the variable valve fails in the seating for valve-opening.

13. A control method of controlling an electromagnetically driven valve, which includes at least one of an electromagnetically driven exhaust valve for opening or closing an exhaust valve and an electromagnetically driven intake valve for opening or closing an intake valve in an internal combustion engine, said control method comprising:
- a first judging process of judging whether or not the electromagnetically driven valve fails in seating for valve-opening; and
- a fail-safe process of controlling the electromagnetically driven valve to perform an operation of valve-opening again in a same stroke of the operation of valve-opening if the electromagnetically driven valve fails in seating for valve-opening.

14. The control method of controlling an electromagnetically driven valve according to claim 13, wherein said fail-safe process further controls at least one of the electromagnetically driven valve, a fuel injection valve, and an ignition plug to prohibit at least one of an operation of valve-opening of the electromagnetically driven valve, and fuel injection and ignition with respect to the internal combustion engine, until a same stroke in a next cycle of the operation of valve-opening, if it is judged that the electromagnetically driven valve fails in the seating for valve-opening.

15. A control method of controlling a variable valve mechanism for controlling a variable valve, which includes at least one of a variable exhaust valve for opening or closing an exhaust valve and a variable intake valve for opening or closing an intake valve in an internal combustion engine, said control method comprising:
- a first judging process of judging whether or not the variable valve fails in seating for valve-opening; and
- a fail-safe process of controlling the variable valve to perform an operation of valve-opening again in a same stroke of the operation of valve-opening if the variable valve fails in seating for valve-opening.

* * * * *